US011388772B2

United States Patent
Cui et al.

(10) Patent No.: US 11,388,772 B2
(45) Date of Patent: Jul. 12, 2022

(54) USER EQUIPMENT AND COMMUNICATION METHOD FOR DETECTION OF A CONTROL CHANNEL IN A DISCONTINUOUS RECEPTION CYCLE

(71) Applicants: Sony Corporation, Tokyo (JP); Qimei Cui, Beijing (CN)

(72) Inventors: Qimei Cui, Beijing (CN); Bowen Cai, Beijing (CN); Tao Cui, Beijing (CN); Xiaofeng Tao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/954,215

(22) PCT Filed: Apr. 30, 2019

(86) PCT No.: PCT/CN2019/085078
§ 371 (c)(1),
(2) Date: Jun. 16, 2020

(87) PCT Pub. No.: WO2019/214493
PCT Pub. Date: Nov. 14, 2019

(65) Prior Publication Data
US 2021/0153288 A1    May 20, 2021

(30) Foreign Application Priority Data
May 8, 2018 (CN) .......................... 201810431313.0

(51) Int. Cl.
*H04B 7/00* (2006.01)
*H04W 4/00* (2018.01)
(Continued)

(52) U.S. Cl.
CPC ........... *H04W 76/28* (2018.02); *H04W 16/14* (2013.01); *H04W 24/04* (2013.01)

(58) Field of Classification Search
CPC ...... H04W 76/28; H04W 16/14; H04W 24/04
(Continued)

(56) References Cited

U.S. PATENT DOCUMENTS

| 2008/0108346 A1* | 5/2008 | Umatt | H04W 48/16 |
| | | | 455/432.1 |
| 2009/0175186 A1* | 7/2009 | Du | H04W 76/28 |
| | | | 370/252 |

(Continued)

FOREIGN PATENT DOCUMENTS

| CN | 104469914 A | 3/2015 |
| CN | 104812032 A | 7/2015 |

(Continued)

OTHER PUBLICATIONS

International Search Report and Written Opinion dated Jul. 17, 2019 for PCT/CN2019/085078 filed on Apr. 30, 2019, 9 pages including English Translation of the International Search Report.

*Primary Examiner* — Mark G. Pannell
(74) *Attorney, Agent, or Firm* — Xsensus LLP

(57) ABSTRACT

The present invention relates to user equipment, an electronic device, a wireless communication method, and a storage medium. According to the present invention, the user equipment comprises a processing circuit, configured to: detect a physical downlink control channel (PDCCH) on a first bandwidth part of an unlicensed frequency band in a detection time of a discontinuous reception (DRX) period; and detect the PDCCH on a second bandwidth part of the unlicensed frequency band when the PDCCH is not detected on the first bandwidth part. By using the user equipment, the electronic device, the wireless communication method, and the storage medium in the present invention, a DRX mechanism of the user equipment operating on the unlicensed frequency band can be improved.

10 Claims, 20 Drawing Sheets

(51) Int. Cl.
*H04W 76/28* (2018.01)
*H04W 16/14* (2009.01)
*H04W 24/04* (2009.01)

(58) Field of Classification Search
USPC .......................................................... 370/310
See application file for complete search history.

(56) References Cited

U.S. PATENT DOCUMENTS

| | | | | |
|---|---|---|---|---|
| 2018/0110004 | A1* | 4/2018 | Lu | H04W 76/28 |
| 2018/0279358 | A1* | 9/2018 | Babaei | H04W 72/0453 |
| 2019/0045571 | A1* | 2/2019 | Wu | H04W 76/15 |
| 2019/0104516 | A1* | 4/2019 | Oh | H04L 5/0053 |
| 2019/0104543 | A1* | 4/2019 | Park | H04W 72/0453 |
| 2021/0022080 | A1* | 1/2021 | Chang | H04L 5/0098 |

FOREIGN PATENT DOCUMENTS

| | | |
|---|---|---|
| CN | 105009623 A | 10/2015 |
| WO | 2017/171922 A2 | 10/2017 |

* cited by examiner

USER EQUIPMENT AND COMMUNICATION METHOD FOR DETECTION OF A CONTROL CHANNEL IN A DISCONTINUOUS RECEPTION CYCLE

CROSS-REFERENCE TO RELATED APPLICATIONS

The present application is based on PCT filing PCT/CN2019/085078, filed Apr. 30, 2019, and claims priority to Chinese Patent Application No. 201810431313.0, filed May 8, 2018 with the Chinese Patent Office, each of which is incorporated herein by reference in its entirety.

FIELD

Embodiments of the present application generally relate to the field of wireless communications, in particular to a user equipment, an electronic device, a wireless communication method and a computer readable storage medium. In more particular, the present disclosure relates to an electronic device as a network side device in a wireless communication system, a user equipment in a wireless communication system, a wireless communication method performed by a network side device in a wireless communication system, a wireless communication method performed by a user equipment in a wireless communication system and a computer readable storage medium.

BACKGROUND

Discontinuous Reception (DRX) is a mechanism for reducing power loss of a user equipment. According to the DRX mechanism, the user equipment may detect physical downlink control channel (PDCCH) from the network side device in detection time of a DRX cycle. In a case that no PDCCH from the network side device is detected, the user equipment enters sleep time of the DRX cycle, and thus waits for a next DRX cycle. In a case that the PDCCH from the network side device is detected, the user equipment receives and demodulates the PDCCH, and thus performs uplink/downlink data transmission with the network side device according to the demodulated PDCCH. The user equipment detects PDCCH periodically according to the DRX mechanism, and the user equipment may enter the sleep state in a case that no PDCCH is detected, thereby greatly reducing power consumption of the user equipment and saving electrical quantity of the user equipment.

In a case that the user equipment and the network side device operate on an unauthorized frequency band, and if the network side device needs to send PDCCH to the user equipment and a bandwidth part (BWP) in an active state of the user equipment is occupied by other device, the network side device cannot send PDCCH and the user equipment cannot detect PDCCH. In this case, the user equipment does not receive PDCCH which should be originally sent to the user equipment, resulting in influencing on subsequent data transmission.

Therefore, it is required to propose a technical solution to improve the DRX mechanism of the user equipment operating on the unauthorized frequency band.

SUMMARY

A general summary of the present disclosure is provided here, rather than full disclosing of the whole scope or all features of the present disclosure.

An object of the present disclosure is to provide a user equipment, an electronic device, a wireless communication method and a computer readable storage medium, so as to improve a DRX mechanism of a user equipment operating in an unauthorized frequency band.

According to an aspect of the present disclosure, a user equipment is provided. The user equipment includes processing circuitry configured to: detect a Physical Downlink Control Channel PDCCH on a first bandwidth part (first BWP) of an unauthorized frequency band in detection time of Discontinuous Reception DRX cycle; and when no PDCCH is detected on the first bandwidth part, detect a PDCCH on a second bandwidth part (second BWP) of the unauthorized frequency band.

According to another aspect of the present disclosure, an electronic device as a network side device is provided. The electronic device includes processing circuitry configured to: in a case where a first bandwidth part of an unauthorized frequency band is occupied and a second bandwidth part of the unauthorized frequency band is idle, send a Physical Downlink Control Channel PDCCH to a user equipment using the second bandwidth part.

According to another aspect of the present disclosure, a wireless communication method executed by a user equipment is provided. The method includes: detecting a Physical Downlink Control Channel PDCCH on a first bandwidth part of an unauthorized frequency band in detection time of a Discontinuous Reception DRX cycle; and when no PDCCH is detected on the first bandwidth part, detecting a PDCCH on a second bandwidth part of the unauthorized frequency band.

According to another aspect of the present disclosure, a wireless communication method executed by a network side device is provided. The method includes: in a case where a first bandwidth part of an unauthorized frequency band is occupied and a second bandwidth part of the unauthorized frequency band is idle, sending a Physical Downlink Control Channel PDCCH to a user equipment using the second bandwidth part.

According to another aspect of the present disclosure, a computer readable storage medium including executable computer instructions is provided. The executable computer instructions, when being executed by a computer, cause the computer to perform the wireless communication method according to the present disclosure.

With the user equipment, the electronic device, the wireless communication method and the computer readable storage medium according to the present disclosure, in a case that the network side device detects that one BWP of the user equipment is occupied, PDCCH can be sent on other BWP. If the user equipment detects no PDCCH on a certain BWP, the user equipment can detect PDCCH on other BWP, thereby avoiding a case that the PDCCH from the network side device is not received, and thus improving the DRX mechanism of the user equipment operating on the unauthorized frequency band.

According to the description provided here, further adaptive region becomes apparent. The description and specific examples in the summary are only schematic, rather than limiting the scope of the present disclosure

BRIEF DESCRIPTION OF THE DRAWINGS

Drawings described herein show only schematic embodiments rather than all possible embodiments, and are not intended to limit the scope of the present disclosure. In the drawings.

Figure 1:
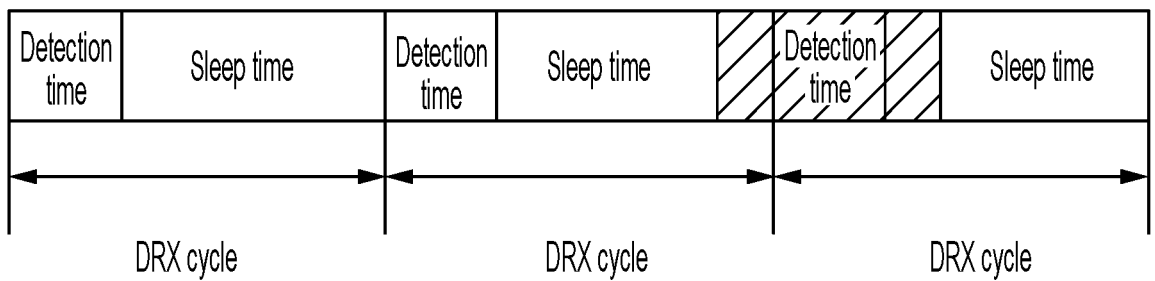
FIG. 1 is a schematic diagram showing configuration of a DRX cycle according to an embodiment of the present disclosure.

Although the present disclosure is easily subjected to various modifications and replacements, specific embodiments as examples are shown in the drawings and described in detail here. However, it should be understood that, the description of specific embodiments is not intended to limit the present disclosure. In contrast, the present disclosure is intended to cover all modifications, equivalents and replacements falling within the spirit and scope of the present disclosure. It should be noted that, corresponding reference numerals indicate corresponding components throughout several drawings.

DETAILED DESCRIPTION OF EMBODIMENTS

Examples of the present disclosure are fully disclosed with reference to the drawings. The description below is only schematic in essence, and is not intended to limit the present disclosure, application or usage.

Schematic embodiments are provided, so that the present disclosure will become thorough and fully convey the scope thereof to those skilled in the art. Many specific details such as examples of specific components, devices and methods are clarified here, to provide detailed understanding of embodiments of the present disclosure. It is apparent for those skilled in the art that, the schematic embodiments may be implemented by many different ways without using specific details, which should not be understood as limiting the scope of the present disclosure. In some schematic examples, well-known processes, structures and technologies are not described in detail.

FIG. 1 is a schematic diagram of configurations of a DRX cycle according to an embodiment of the present disclosure. As shown in FIG. 1, a DRX cycle is configured for a user equipment. Each DRX cycle includes detection time and sleep time. During the detection time, the user equipment detects whether there is PDCCH from a network side device. If no PDCCH from the network side device is detected, the user equipment enters sleep time of the DRX cycle, and detects PDCCH in detection time of a next DRX cycle. In new radio (NR) communication system, the user equipment may be provided with multiple BWPs (for example, four BWPs) for receiving downlink information. Among the multiple BWPs, one BWP is in an active state, and other BWPs are in an inactive state. Generally, the user equipment detects PDCCH on only the BWP in the active state. In FIG. 1, a shadow region represents that a bandwidth part currently used by the user equipment is occupied by other device, thus a network side device cannot send the PDCCH and the user equipment cannot detect the PDCCH.

For such scenario, a user equipment, an electronic device, a wireless communication method performed by an electronic device in a wireless communication system, a wireless communication method performed by a user equipment in a wireless communication system and a computer readable storage medium are provided according to the present disclosure, so as to improve a DRX mechanism of a user equipment operating on an unauthorized frequency band.

The wireless communication system according to the present disclosure may be a 5G NR communication system, and the user equipment and the network side device may operate on the unauthorized frequency band. That is, multiple BWPs pre-configured for the user equipment each may be BWP of the unauthorized frequency band.

The network side device according to the present disclosure may be any type of transmit and receive port (TRP). The TRP may have transmission and receiving functions. For example, the TRP may receive information from a user equipment and a base station device, and may send information to the user equipment and the base station device. In an example, the TRP may provide service for the user equipment, and is controlled by the base station device. That is, the base station device provides services for the user equipment via the TRP. In addition, the network side device described in the present disclosure may be a base station device such as an eNB, or may be a gNB (a base station in the fifth generation of communication system).

The user equipment according to the present disclosure may be a mobile terminal (such as a smartphone, a tablet personal computer (PC), a notebook PC, a portable game terminal, a portable/dongle mobile router and a digital camera) or an in-vehicle terminal (such as a vehicle navigation device). The user equipment may be implemented as a terminal performing machine to machine (M2M) communication (also referred to as machine type communication (MTC) terminal). In addition, the user equipment may be a wireless communication module (such as an integrated circuit module including a single wafer) installed in each of the terminals.

Figure 2:
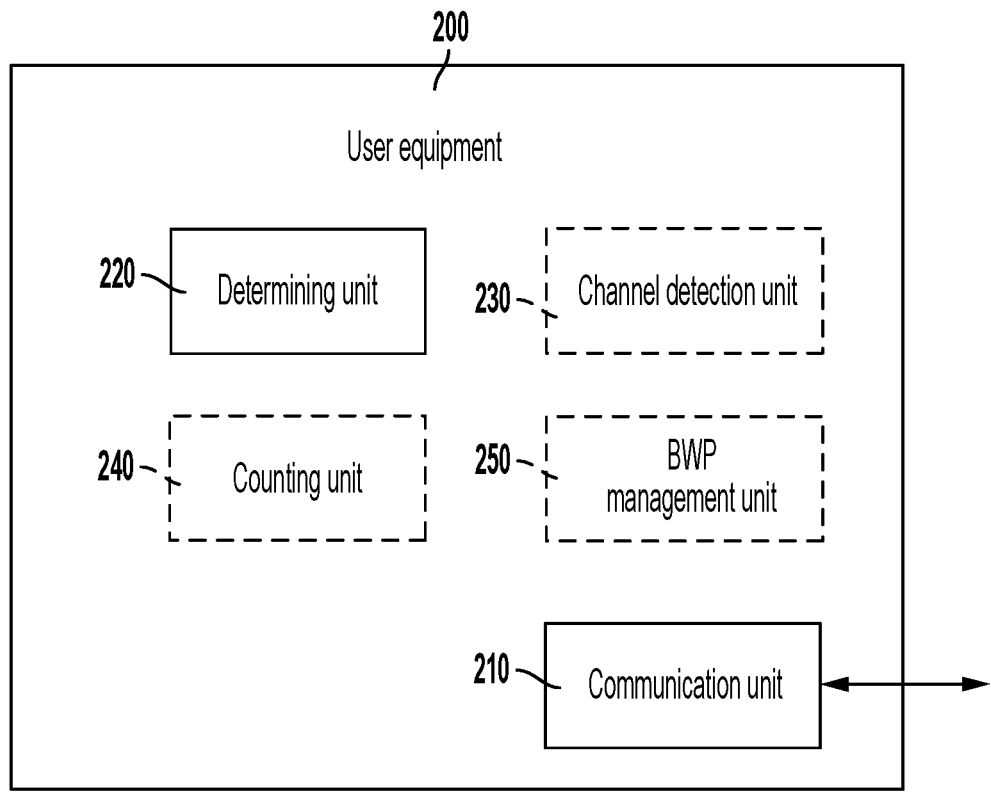
FIG. 2 is a block diagram showing a structure of a user equipment according to an embodiment of the present disclosure.

FIG. 2 is a block diagram of an example of configurations of a user equipment 200 according to an embodiment of the present disclosure.

As shown in FIG. 2, the user equipment 200 may include a communication unit 210 and a determining unit 220.

Herein, units of the user equipment 200 may be included in processing circuitry. It should be noted that, the user equipment 200 may include one or more processing circuitry. Further, the processing circuitry may include various discrete functional units to perform various different functions and/or operations. It should be noted that, the functional units may be physical entities or logical entities, and units with different names may be implemented by the same physical entity.

According to the embodiment of the present disclosure, the communication unit 210 may send and receive various types of information. For example, the communication unit 210 may receive PDCCH and downlink data information from the network side device, and may send uplink data information to the network side device. The network side device herein may be a network side device providing service for the user equipment 200. Further, the determining unit 220 may determine time frequency resource for receiving the PDCCH, for example, determine to receive PDCCH on one or more BWPs among the multiple BWPs pre-configured for the user equipment 200.

Herein, the user equipment 200 may operate on the unauthorized frequency band and is configured to use the DRX mechanism. The DRX cycle configured for the user equipment 200 may include detection time and sleep time. PDCCH is detected in the detection time, and PDCCH is not detected in the sleep time.

According to the embodiment of the present disclosure, the determining unit 220 may determine that the resource for detecting PDCCH is a first BWP of the unauthorized frequency band, and thus the user equipment 200 detects PDCCH on the first BWP in the detection time of the DRX cycle via the communication unit 210.

According to the embodiment of the present disclosure, in a case that the user equipment 200 does not detect PDCCH on the first BWP, the determining unit 220 may determine that the resource for detecting PDCCH is a second BWP of the unauthorized frequency band, and thus the user equipment 200 may detect PDCCH on the second BWP in detection time of the DRX cycle via the communication unit 210.

It follows that, the user equipment 200 according to the embodiment of the present disclosure first detects PDCCH on the first BWP, and may detect PDCCH on the second BWP in a case that no PDCCH is detected on the first BWP; thereby improving the DRX mechanism of the unauthorized frequency band.

Figure 3:
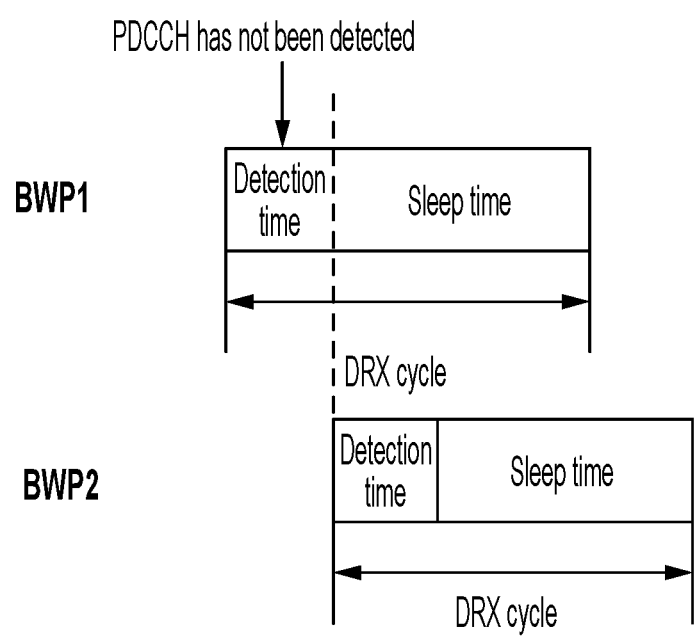
FIG. 3 is a schematic diagram showing a process of detecting PDCCH by switching BWP according to an embodiment of the present disclosure.

FIG. 3 is a schematic diagram showing a process of detecting PDCCH by switching BWP according to an embodiment of the present disclosure. As shown in FIG. 3, the user equipment 200 detects PDCCH on BWP1 according to the DRX cycle. In a case that the user equipment 200 does not detect PDCCH on BWP1 in detection time of the DRX cycle, the user equipment 200 detects PDCCH on BWP2 in detection time of the DRX cycle.

According to the embodiment of the present disclosure, the first BWP and the second BWP each may be BWPs for receiving downlink information which are pre-configured for the user equipment 200. Herein, the user equipment 200 may be provided with multiple BWPs for receiving downlink information. Among the multiple BWPs, one BWP is in an active state, and other BWPs are in an inactive state. According to the embodiment of the present disclosure, the first BWP is in the active state, and the second BWP is the inactive state.

That is, according to the embodiment of the present disclosure, the user equipment 200 may detect PDCCH on the BWP in the active state. In a case that no PDCCH is detected on the BWP in the active state, the user equipment 200 may detect PDCCH on one of the BWPs in the inactive state.

According to the embodiment of the present disclosure, as shown in FIG. 2, the user equipment 200 may include a BWP management unit 250 configured to manage and store multiple BWPs for receiving downlink information configured for the user equipment 200. For example, the BWP management unit 250 may store information about an active state of each BWP and so on.

According to the embodiment of the present disclosure, the user equipment 200 may receive information about multiple pre-configured BWPs from the network side device via the communication unit 210. For example, the user equipment 200 may receive information about the multiple BWPs from the network side device via high layer signaling, including but not limited to radio resource control (RRC) signaling. Further, the user equipment 200 may store the received information about the multiple BWPs in the BWP management unit 250.

According to the embodiment of the present disclosure, the user equipment 200 may receive information about the BWP in the active state from the network side device via the communication unit 210. The information about the BWP in the active state may include identification information about the BWP in the active state. For example, the user equipment 200 may receive the information about the BWP in the active state from the network side device via high layer signaling, including but not limited to RRC signaling (for example, via a field of firstActiveDownlinkBwp-Id in the RRC signaling). Further, the user equipment 200 may store the received information about the BWP in the active state in the BWP management unit 250. In addition, in a case that the BWP in the active state pre-configured for the user equipment 200 changes, the user equipment 200 may receive information about an updated BWP in the active state from the network side device. The information about the updated BWP in the active state may include identification information of the updated BWP in the active state. The user equipment 200 may receive the information about the updated BWP in the active state from the network side device via high layer signaling including but not limited to RRC signaling, and low layer signaling including but not limited downlink control information (DCI). Further, the user equipment 200 may update a storage record in the BWP storage unit 250 according to the information about the updated BWP in the active state.

According to the embodiment of the present disclosure, the second BWP may be a default BWP configured for the user equipment 200. That is, the second BWP may be default BWP among the BWPs in the inactive state configured for the user equipment 200. A priority of the default BWP is lower than the BWP in the active state and higher than the other BWPs in the inactive state. That is, the network side device may send downlink information on the default BWP with a great probability.

According to the embodiment of the present disclosure, the user equipment 200 may receive information about the default BWP from the network side device via the communication unit 210. The information about the default BWP may include identification information about the default BWP. For example, the user equipment 200 may receive information about the default BWP from the network side device via high layer signaling including but not limited to RRC signaling (for example, via a field of defaultDownlikBwp-Id in the RRC signaling). Further, the user equipment 200 may further store the received information about the default BWP in the BWP management unit 250. In addition, in a case that the default BWP pre-configured for the user equipment 200 changes, the user equipment 200 may receive information about the updated default BWP from the network side device. The information about the updated default BWP may include identification information about the updated default BWP. The user equipment 200 may receive the information about the updated default BWP from the network side device via high layer signaling including but not limited to RRC signaling, and low layer signaling including but not limited to DCI. Further, the user equipment 200 may update a storage record in the BWP storage unit 250 according to the information about the updated default BWP.

It follows that, multiple BWPs for receiving downlink information may be configured for the user equipment 200, including a BWP in an active state and a default BWP. For example, four BWPs for receiving downlink information are configured for the user equipment 200, BWP1 is in the active state, and BWP2 is the default BWP. The user equipment 200 may receive the information about the BWP as shown in table 1 from the network side device, and store the information in the BWP management unit 250.

TABLE 1

| Identification information | Time frequency resource position | state |
| --- | --- | --- |
| BWP1 | position 1 | active |
| BWP2 | position 2 | inactive, default |
| BWP3 | position 3 | inactive |
| BWP4 | position 4 | inactive |

As described above, the user equipment 200 may be configured to detect PDCCH by switching BWP once no PDCCH is detected, thereby reducing a probability that no PDCCH is received to a maximum degree.

According to the embodiment of the present disclosure, as shown in FIG. 2, the user equipment 200 may further include a counting unit 240 configured to set a counter. The counter represents the number of times of the user equipment to continuously detect no PDCCH on the BWP in the active state, that is, the number of DRX cycles to continuously detect no PDCCH on a BWP in the active state. In addition, an initial value of the counter is zero, and the counter is reset each time PDCCH is detected by the user equipment on the BWP in the active state.

According to the embodiment of the present disclosure, in a case that a first BWP is a BWP in an active state of the user equipment, the counter set by the counting unit 240 represents the number of times of the user equipment 200 to continuously detect no PDCCH on the first BWP. According to the embodiment of the present disclosure, the user equipment 200 may be configured to detect PDCCH on the second BWP only in a case that a value of the counter is greater than a predetermined threshold.

According to the embodiment of the present disclosure, in a case that the user equipment 200 detects PDCCH on the first BWP, the user equipment 200 may demodulate the detected PDCCH and perform uplink/downlink information transmission according to the demodulated PDCCH. In addition, in this case, the counting unit 240 may reset the counter.

According to the embodiment of the present disclosure, in a case that the user equipment 200 detects PDCCH on the first BWP, the user equipment 200 may send feedback information to the network side device via the communication unit 210. The feedback information represents the user equipment 200 detects PDCCH on the first BWP. Herein, the feedback information includes but not limited to uplink control information (UCI). The UCI may represent the feedback information about the PDCCH detected on the first BWP or about subsequent downlink data. That is, the feedback information may implicitly indicate that the PDCCH sent by the network side device has been detected by the user equipment 200.

According to the embodiment of the present disclosure, in a case that PDCCH is not detected by the user equipment 200 on the first BWP and the value of the counter is not greater than the predetermined threshold, the user equipment 200 may enter sleep time of the DRX cycle.

According to the embodiment of the present disclosure, in a case that the user equipment 200 detects no PDCCH on the first BWP and the value of the counter is greater than the predetermined threshold, the user equipment 200 may be configured to detect PDCCH on the second BWP. Further, in this case, the counting unit 240 may add 1 to the value of the counter.

Figure 4:
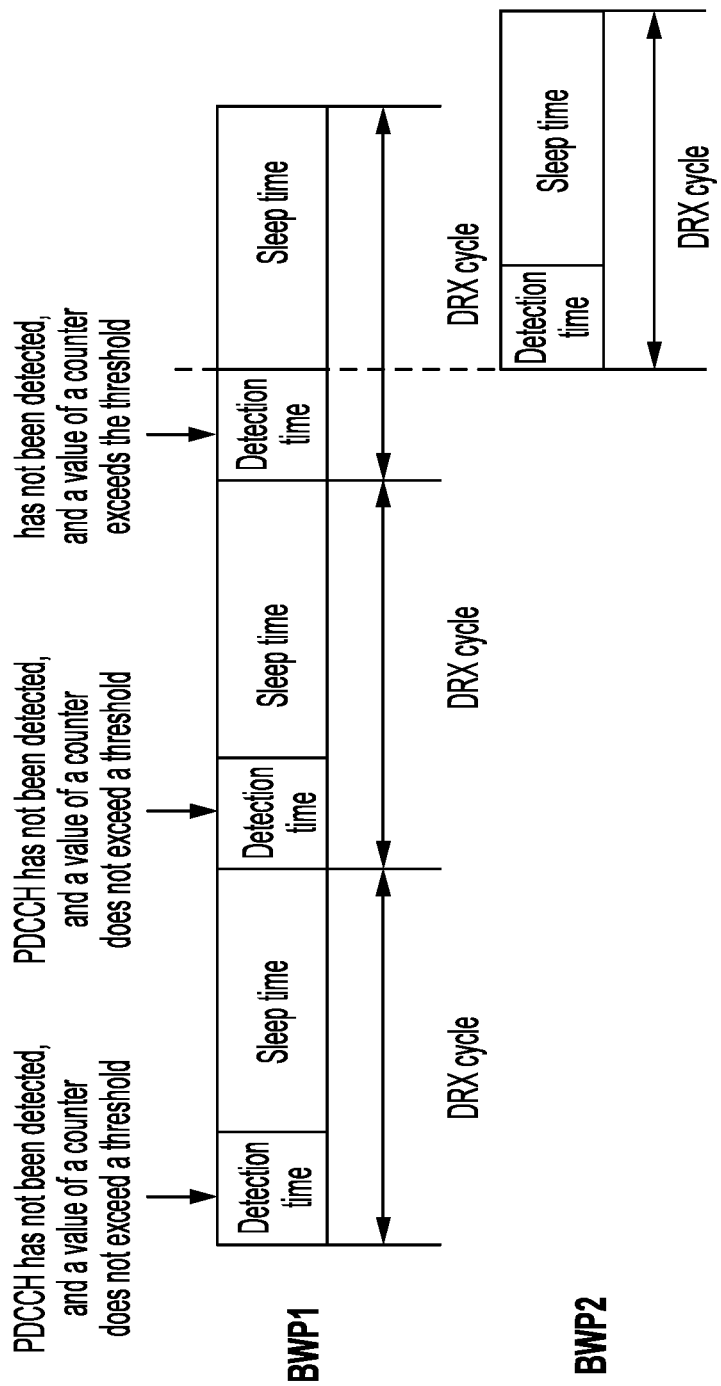
FIG. 4 is a schematic diagram showing a process of detecting PDCCH by switching BWP according to an embodiment of the present disclosure.

FIG. 4 is a schematic diagram of a process of detecting PDCCH by switching BWP according to an embodiment of the present disclosure. As shown in FIG. 4, in detection time of a first DRX cycle, the user equipment 200 detects PDCCH on BWP1. If the user equipment 200 detects no PDCCH, the counting unit 240 adds 1 to the value of the counter, and determines whether the value of the counter after adding 1 exceeds a predetermined threshold. In a case that the value of the counter does not exceed the predetermined threshold, the user equipment 200 enters the sleep time of the first DRX cycle. Subsequently, in detection time of a second DRX cycle, the user equipment 200 detects PDCCH on BWP1. If the user equipment 200 detects no PDCCH, the counting unit 240 adds 1 to the value of the counter and determines whether the value of the counter after adding 1 exceeds a predetermined threshold. If the value of the counter does not exceed the predetermined threshold, the user equipment 200 enters sleep time of the second DRX cycle. Subsequently, in detection time of the third DRX cycle, the user equipment 200 detects PDCCH on BWP1. If the user equipment 200 detects no PDCCH, the counting unit 240 adds 1 to a value of the counter and determines whether the value of the counter after adding 1 exceeds the predetermined threshold. If the value of the counter exceeds the predetermined threshold, the user equipment 200 detects PDCCH on BWP2.

It follows that, according to the embodiment of the present disclosure, the user equipment 200 is unnecessary to switch BWP each time no PDCCH is detected, and the counter is set. PDCCH is detected on the second BWP only in a case that the number of times to continuously detect no PDCCH on the first BWP, that is, the number of the DRX cycles, exceeds the predetermined threshold, thereby avoiding frequent switching between different BWPs by the user equipment 200, and thus reducing signaling overhead.

According to the embodiment of the present disclosure, as shown in FIG. 2, the user equipment 200 may further include a channel detection unit 230 configured to execute a channel detection process. The channel detection process here includes but not limited to a listen before talk (LBT) process.

According to the embodiment of the present disclosure, the channel detection unit 230 may execute the channel detection process on the first BWP, thereby determining whether the first BWP is occupied. For example, the channel detection unit 230 may perform an LBT process of type 2 on the first BWP. The LBT process may include a channel detection process of 25 µs. The channel detection unit 230 may determine a channel state of the first BWP through the channel detection process. The channel state includes an occupied state and an idle state. The occupied state indicates that the first BWP is occupied by other device and cannot be used to send and receive information; and the idle state indicates that the first BWP is not occupied by other device and can be used to send and receive information.

According to the embodiment of the present disclosure, in a case that the user equipment 200 detects no PDCCH on the first BWP and the channel detection unit 230 detects that the first BWP is occupied, the user equipment 200 may detect PDCCH on the second BWP via the communication unit 210. That is, the user equipment 200 is unnecessary to detect PDCCH on the second BWP each time no PDCCH is detected on the first BWP, and the user equipment 200 detects PDCCH on the second BWP only in a case that the first BWP is determined to be occupied.

According to the embodiment of the present disclosure, the channel detection unit 230 may execute the channel detection process after the detection time of the DRX cycle.

That is, in detection time of the DRX cycle, the communication unit 210 receives no PDCCH on the first BWP, the channel detection unit 230 executes the channel detection process after the detection time to determine a channel state of the first BWP. In a case that the channel state of the first BWP indicates that the first BWP is occupied, PDCCH is detected on the second BWP.

Further, according to the embodiment of the present disclosure, in a case that no PDCCH is detected on the first BWP and a channel detection result of the channel detection unit 230 indicates that the first BWP is not occupied, the user equipment 200 may enter the sleep time of the DRX cycle.

Figure 5:
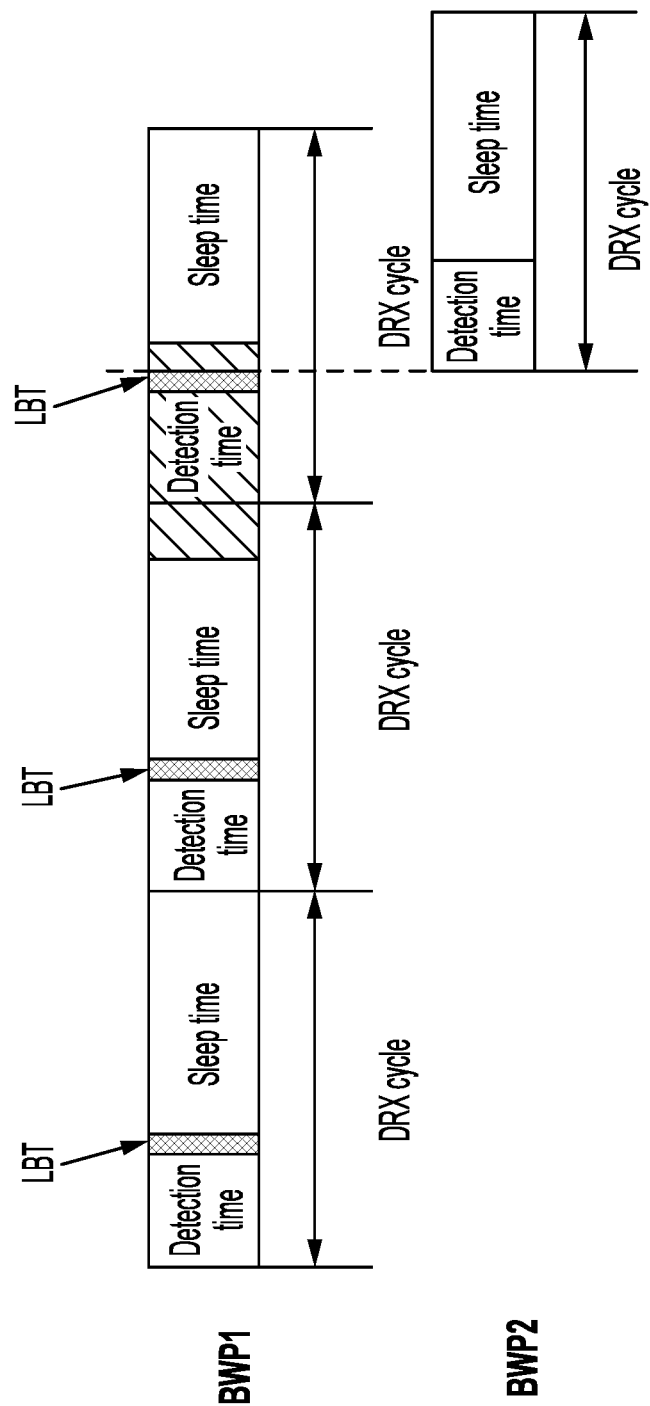
FIG. 5 is a schematic diagram showing a process of detecting PDCCH by switching BWP according to an embodiment of the present disclosure.

FIG. 5 is a schematic diagram showing a process of detecting PDCCH by switching BWP according to an embodiment of the present disclosure. A black region in FIG. 5 indicates a time period during which the LBT process is executed. As shown in FIG. 5, in detection time of a first DRX cycle, the user equipment 200 detects PDCCH on BWP1. If the user equipment 200 detects no PDCCH, the user equipment 200 executes the LBT process. If a result of the LBT process indicates that BWP1 is not occupied, the user equipment 200 enters the sleep time of the first DRX cycle. Subsequently, in detection time of the second DRX cycle, the user equipment 200 detects PDCCH on BWP1. If the user equipment 200 detects no PDCCH, the user equipment 200 executes the LBT process. If a result of the LBT process indicates that BWP1 is not occupied, the user equipment 200 enters the sleep time of the second DRX cycle. Subsequently, in detection time of the third DRX cycle, the user equipment 200 detects PDCCH on BWP1. If the user equipment 200 detects no PDCCH, the user equipment 200 executes the LBT process. If a result of the LBT process indicates that BWP1 is occupied, the user equipment 200 detects PDCCH on BWP2. It should be noted that, FIG. 5 shows an example in which the channel detection process is the LBT process, the channel detection process may be other process in which the channel state can be detected certainly.

It follows that, according to the embodiment of the present disclosure, the user equipment 200 is unnecessary to switch BWP each time no PDCCH is detected, and may perform the channel detection process. PDCCH is detected on the second BWP only in a case that no PDCCH is detected on the first BWP and the first BWP is occupied, thereby avoiding frequent switching between different BWPs by the user equipment 200 and thus reducing signaling overhead.

As described above, one of the counting unit 240 and the channel detection unit 230 may be set to avoid frequency switching between different BWPs by the user equipment. Further, according to the embodiment of the present disclosure, the user equipment 200 may include both the counting unit 240 and the channel detection unit 230, thereby avoiding frequent switching between different BWPs by the user equipment to a maximum degree.

According to the embodiment of the present disclosure, the channel detection unit 230 may be configured to perform the channel detection process only in a case that a value of the counter is greater than the predetermined threshold.

According to the embodiment of the present disclosure, in a case that the user equipment 200 detects no PDCCH on the first BWP and a value of the counter is not greater than the predetermined threshold, the user equipment 200 may enter the sleep time of the DRX cycle.

According to the embodiment of the present disclosure, in a case that the user equipment 200 detects no PDCCH on the first BWP and the value of the counter is greater than predetermined threshold and the first BWP is idle, the user equipment 200 may enter the sleep time of the DRX cycle.

According to the embodiment of the present disclosure, in a case that the user equipment 200 detects no PDCCH on the first BWP and the value of the counter is greater than the predetermined threshold and the first BWP is occupied, the user equipment 200 may be configured to detect PDCCH on the second BWP. Further, in this case, the counting unit 240 may add 1 to the value of the counter.

Figure 6:
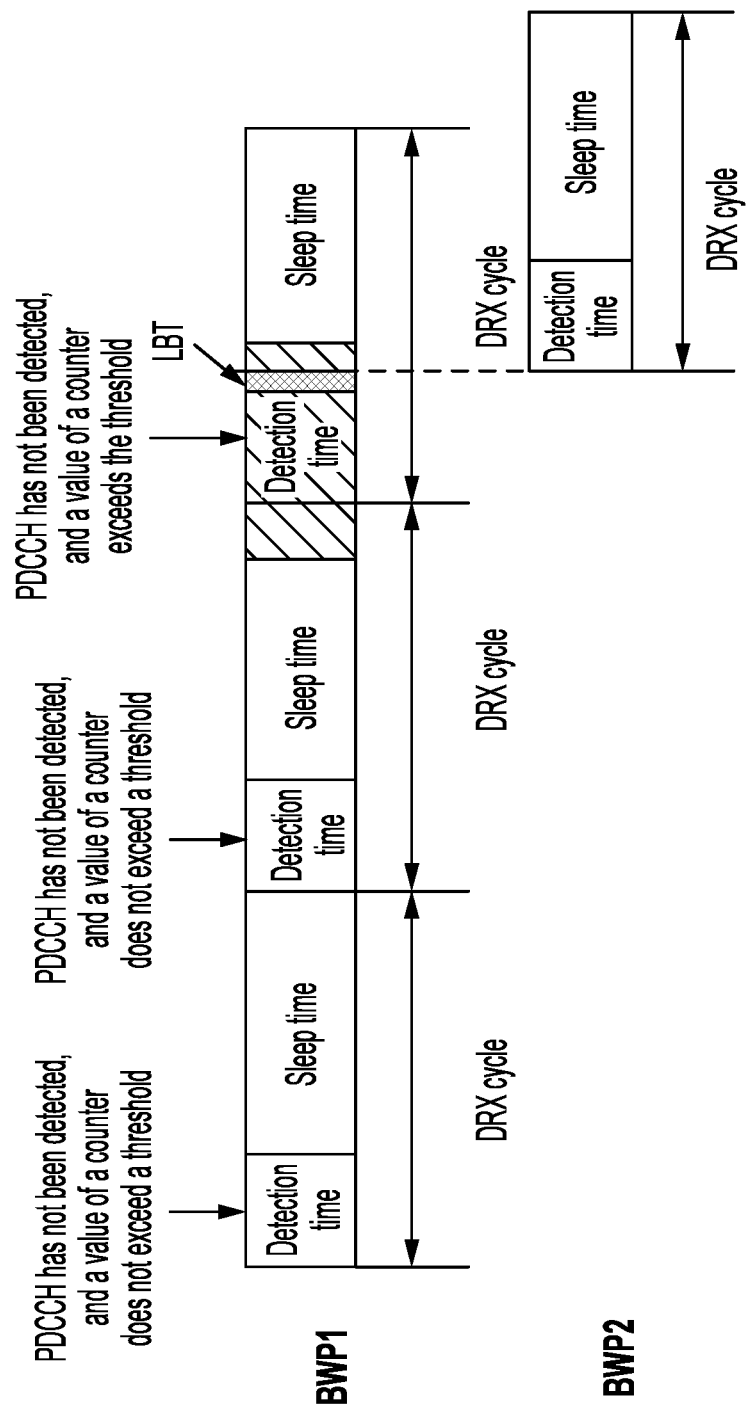
FIG. 6 is a schematic diagram showing a process of detecting PDCCH by switching BWP according to an embodiment of the present disclosure.

FIG. 6 is a schematic diagram showing a process of detecting PDCCH by switching BWP according to an embodiment of the present disclosure. A black region in FIG. 6 indicates a time period during which the LBT process is executed. As shown in FIG. 6, in detection time of the first DRX cycle, the user equipment 200 detects PDCCH on BWP1. If the user equipment 200 detects no PDCCH, the counting unit 240 adds 1 to a value of the counter, and determines whether a value of the counter after adding 1 exceeds a predetermined threshold. If the value of the counter does not exceed the predetermined threshold, the user equipment 200 enters the sleep time of the first DRX cycle. Subsequently, in detection time of the second DRX cycle, the user equipment 200 detects PDCCH on BWP1. If the user equipment 200 detects no PDCCH, the counting unit 240 adds 1 to the value of the counter and determines whether the value of the counter after adding 1 exceeds the predetermined threshold. If the value of the counter does not exceed the predetermined threshold, the user equipment 200 enters sleep time of the second DRX cycle. Subsequently, in detection time of the third DRX cycle, the user equipment 200 detects PDCCH on BWP1. If the user equipment 200 detects no PDCCH, the counting unit 240 adds 1 to the value of the counter, and determines whether the value of the counter after adding 1 exceeds the predetermined threshold. If the value of the counter exceeds the predetermined threshold, the user equipment 200 executes the LBT process. If a result of the LBT process indicates that BWP1 is occupied, the user equipment 200 detects PDCCH on BWP2. It should be noted that, FIG. 6 shows an example in which the channel detection process is the LBT process, the channel detection process may be other process in which the channel state can be detected certainly.

As described above, according to the embodiment of the present disclosure, the user equipment 200 may be configured to detect PDCCH on the second BWP in any of the following cases: no PDCCH is detected on the first BWP; no PDCCH is detected on the first BWP and the value of the counter is greater than the predetermined threshold; no PDCCH is detected on the first BWP and the first BWP is occupied; and no PDCCH is detected on the first BWP, the value of the counter is greater than the predetermined threshold, and the first BWP is occupied.

According to the embodiment of the present disclosure, the process of detecting PDCCH on the second BWP by the user equipment 200 includes the following two cases. In one case, the user equipment 200 detects PDCCH on the second BWP; and in the other case, the user equipment 200 does not detect PDCCH on the second BWP. Description is made for the two cases hereinafter.

According to the embodiment of the present disclosure, in a case that the user equipment 200 detects PDCCH on the second BWP, the user equipment 200 may demodulate the detected PDCCH, and perform uplink/downlink information transmission according to the demodulated PDCCH.

According to the embodiment of the present disclosure, in a case that the user equipment 200 detects PDCCH on the second BWP, the user equipment 200 may send feedback information to a network side device via the communication unit 210. The feedback information may indicate the user equipment 200 detects PDCCH on the second BWP. Herein, the feedback information includes but not limited to UCI. The UCI may be the feedback information about PDCCH detected on the second BWP or about subsequent downlink data. That is, the feedback information may implicitly indicate that the user equipment 200 has detected the PDCCH sent by the network side device.

According to the embodiment of the present disclosure, in a case that the user equipment 200 detects PDCCH on the second BWP, the BWP management unit 250 may set the second BWP to be in an active state, and set the first BWP to be in an inactive state. That is, the BWP management unit 250 may update a record of states of BWPs stored therein.

According to the embodiment of the present disclosure, in a case that the user equipment 200 detects PDCCH on the second BWP, the user equipment 200 may receive, from the network side device, information that the second BWP is set to be in the active state and the first BWP is set to be in the inactive state. The user equipment 200 may receive such information from the network side device via high layer signaling or low layer signaling, and updates a record of states of BWPs stored in the user equipment according to the information. For example, the user equipment 200 may receive such information from the network device via RRC signaling, or receive such information through DCI carried by PDCCH detected on the second BWP. In addition, the information received by the user equipment 200 from the network side device may include: for example, identification information of a new BWP in the active state, or information of 1 bit indicating to switch the default BWP to the BWP in the active state.

According to the embodiment of the present disclosure, in a case that the user equipment 200 detects PDCCH on the second BWP, the user equipment 200 may receive information about the updated default BWP from the network side device, and update the information about the default BWP stored in the BWP management unit 250 according to the received information. For example, the user equipment 200 may receive such information form the network side device via the RRC signaling, or may receive such information via DCI carried by PDCCH detected on the second BWP. In addition, the information received by the user equipment 200 from the network side device may include identification information about a new default BWP.

Further, according to the embodiment of the present disclosure, the new default BWP may be any BWP other than the second BWP, and certainly may be the first BWP. That is, the new default BWP received by the user equipment 200 may be the BWP originally in the active state, or may be the other BWP originally in the inactive state.

According to the embodiment of the present disclosure, in a case that the user equipment 200 detects PDCCH on the second BWP, the user equipment 200 may detect PDCCH on the second BWP in detection time of a next DRX cycle. This is because the second BWP changes into the BWP in the active state and the user equipment 200 detects PDCCH on the BWP in the active state first by default.

Figure 7A:
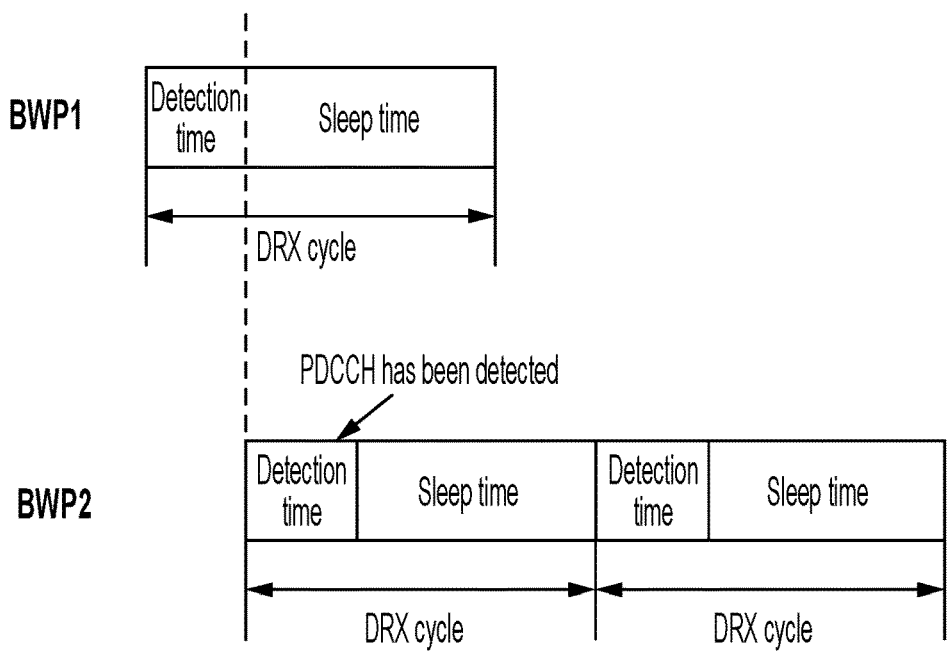
FIG. 7(a) is a schematic diagram showing a process of detecting PDCCH by switching BWP according to an embodiment of the present disclosure.

FIG. 7(*a*) is a schematic diagram showing a process of detecting PDCCH by switching BWP according to an embodiment of the present disclosure. As shown in FIG. 7(*a*), if the user equipment does not detect PDCCH on BWP1, the user equipment 200 detects PDCCH on BWP2. If the user equipment 200 detects PDCCH in a first DRX cycle of BWP2, the user equipment 200 still detects PDCCH on BWP2 in a second DRX cycle of BWP2. Herein, FIG. 7(*a*) shows the case that the user equipment detects PDCCH on the second BWP in response to detecting no PDCCH on the first BWP. Practically, the user equipment may be triggered to detect PDCCH on the second BWP in response to any of other conditions described above.

According to the embodiment of the present disclosure, in a case that the user equipment 200 does not detect PDCCH on the second BWP, the BWP in the active state may be still the first BWP, and the default BWP may be still the second BWP. In this case, the user equipment 200 detects PDCCH on the BWP in the active state first by default, so the user equipment may be configured to detect PDCCH on the first BWP in detection time of a next DRX cycle of the DRX cycle.

Figure 7B:
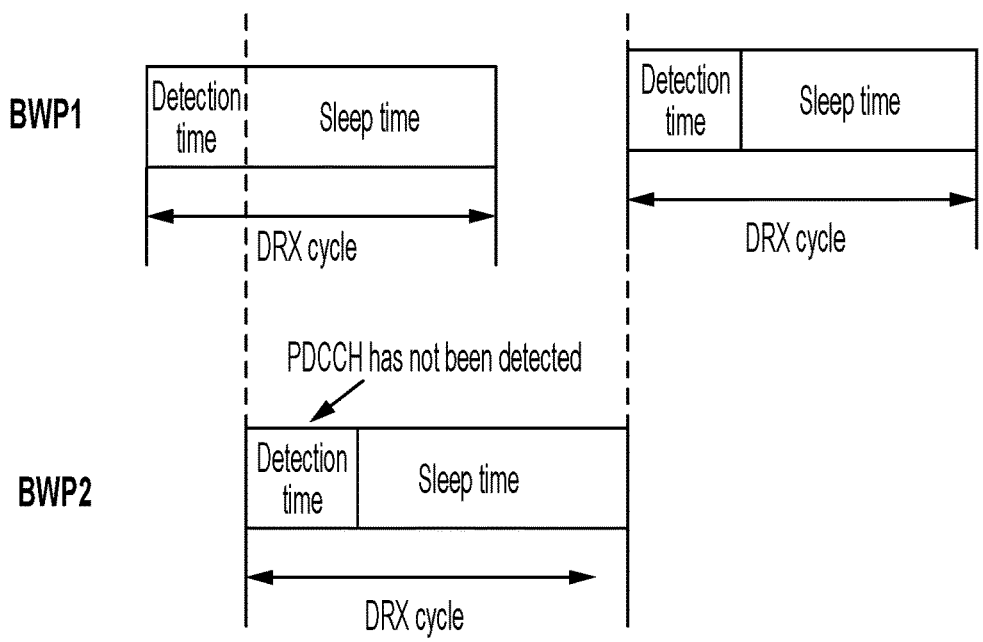
FIG. 7(b) is a schematic diagram showing a process of detecting PDCCH by switching BWP according to an embodiment of the present disclosure.

FIG. 7(*b*) is a schematic diagram showing a process of detecting PDCCH by switching BWP according to an embodiment of the present disclosure. As shown in FIG. 7(*b*), if the user equipment does not detect PDCCH on BWP1, the user equipment 200 detects PDCCH on BWP2. If the user equipment 200 detects no PDCCH in a first DRX cycle of BWP2, the user equipment 200 still detects PDCCH on BWP1 in a next DRX cycle. Herein, FIG. 7(b) shows the case that the user equipment detects PDCCH on the second BWP in response to detecting no PDCCH on the first BWP. Practically, the user equipment may be triggered to detect PDCCH on the second BWP in response to any of other conditions described above.

According to the embodiment of the present disclosure, in a case that the user equipment 200 does not detect PDCCH on the second BWP, the user equipment 200 may enter sleep time of the DRX cycle.

It follows that, according to the embodiment of the present disclosure, the user equipment 200 may detect PDCCH in the active state. The user equipment 200 may detect PDCCH on the default BWP in a case that no PDCCH is detected on the BWP in the active state, thereby avoiding the case that the user equipment 200 cannot detect the PDCCH. Further, the user equipment 200 may avoid frequent switching between BWPs by setting the counter and/or the channel detection process. In addition, the user equipment 200 determines whether to switch the BWP in the active state according to a result that whether PDCCH is detected on the default BWP. In summary, according to the embodiment of the present disclosure, the DRX mechanism of the user equipment operating on the unauthorized frequency band can be improved.

Figure 8:
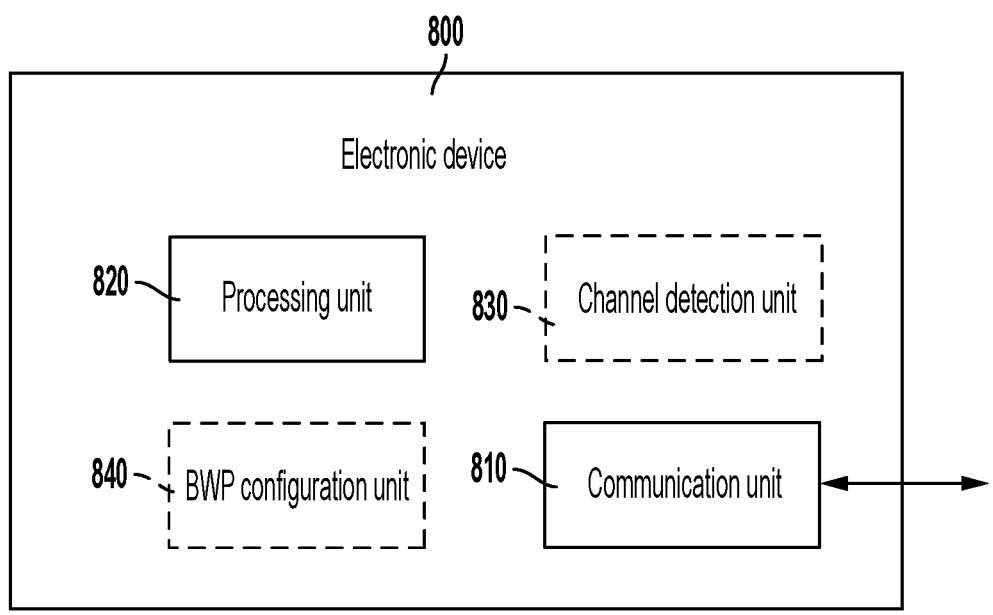
FIG. 8 is a block diagram showing a structure of an electronic device as a network side device according to an embodiment of the present disclosure.

FIG. 8 is a block diagram of a structure of an electronic device 800 as a network side device in a wireless communication system according to an embodiment of the present disclosure.

As shown in FIG. 8, the electronic device 800 may include a communication unit 810 and a processing unit 820.

Herein, units of the electronic device 800 may be included in a processing circuit. It should be noted that, the electronic device 800 may include one or more processing circuitry. Further, the processing circuitry may include various discrete functional units to perform different functions and/or operations. It should be noted that, the functional units may be physical entities or logical entities, and units with different names may be implemented by the same physical entity.

According to the embodiment of the present disclosure, the communication unit 810 may send and receive information. For example, the communication unit 810 may send various types of PDCCH and downlink data information to the user equipment, and may receive uplink data information from the user equipment. The user equipment here may be a user equipment in a coverage of the electronic device 800.

According to the embodiment of the present disclosure, the processing unit 820 may determine time frequency resource for sending PDCCH, for example, determine to send PDCCH on one or more BWPs among multiple BWPs pre-configured for the user equipment.

According to the embodiment of the present disclosure, in a case that the first BWP of the unauthorized frequency band is occupied and the second BWP of the unauthorized frequency band is idle, the processing unit 820 may determine that resource for sending PDCCH is the second BWP, and thus the communication unit 810 of the electronic device 800 may send PDCCH to the user equipment via the second BWP.

It follows that, the electronic device 800 according to the embodiment of the present disclosure can send PDCCH to the user equipment by using the second BWP in a case that the first BWP is occupied, thereby avoiding a case that the PDCCH cannot be sent since the first BWP is occupied.

According to the embodiment of the present disclosure, as shown in FIG. 8, the electronic device 800 may include a BWP configuration unit 840 configured to configure BWP for receiving downlink information for the user equipment. Herein, the BWP configuration unit 840 of the electronic device 800 may pre-configure multiple BWPs for receiving downlink information for the user equipment. Among the multiple BWPs, one BWP is in the active state, and other BWPs are in the inactive state. According to the embodiment of the present disclosure, both the first BWP and the second BWP may be BWPs for receiving downlink information pre-configured for the user equipment.

According to the embodiment of the present disclosure, the electronic device 800 may send information about the preconfigured multiple BWPs to the user equipment via the communication unit 210. For example, the electronic device 800 may send information about the multiple BWP to the user equipment via high layer signaling, including but not limited to RRC signaling.

According to the embodiment of the present disclosure, the first BWP is the active state, and the second BWP is in the inactive state.

According to the embodiment of the present disclosure, the electronic device 800 may send information about the BWP in the active state to the user equipment via the communication unit 810. The information about the BWP in the active state may include identification information about the BWP in the active state. For example, the electronic device 800 may send the information about the BWP in the active state to the user equipment via high layer signaling, including but not limited to RRC signaling (for example, via a field of firstActiveDownlinkBwp-Id in the RRC signaling). In addition, in a case that the electronic device 800 determines that the BWP in the active state of the user equipment changes, the electronic device 800 may send information about the updated BWP in the active state to the user equipment. The information about the updated BWP in the active state may include identification information about the updated BWP in the active state. The electronic device 800 may send the information about the updated BWP in the active state via high layer signaling including but not limited to RRC signaling, and low layer signaling including but not limited to DCI.

According to the embodiment of the present disclosure, the second BWP may be a default BWP configured for the user equipment. That is, the second BWP may be a default BWP among BWPs in the inactive state configured for the user equipment.

According to the embodiment of the present disclosure, the electronic device 800 may send information about the default BWP to the user equipment via the communication unit 810. The information about the default BWP may include identification information about the default BWP. For example, the electronic device 800 may send the information about the default BWP to the user equipment via high layer signaling, including but not limited to RRC signaling (For example, via a field of defaultDownlinkBwp-Id in the RRC signaling). In addition, in a case that the electronic device 800 determines that the default BWP pre-configured for the user equipment changes, the electronic device 800 may send information about the updated default BWP to the user equipment. The information about the updated default BWP may include identification information about the updated default BWP. The electronic device 800 may send information about the updated default BWP to the user equipment via high layer signaling including but not limited to RRC signaling and low layer signaling including but not limited to DCI.

As described above, according to the embodiment of the present disclosure, the electronic device 800 may send PDCCH on the BWP in the active state first. In a case that the BWP in the active state of the user equipment is occupied, the electronic device 800 may send PDCCH on the default BWP.

According to the embodiment of the present disclosure, as shown in FIG. 8, the electronic device 800 may include a channel detection unit 830 configured to execute a channel detection process. The channel detection process here includes but not limited to a listen before talk (LBT) process.

According to the embodiment of the present disclosure, the electronic device 800 may execute the channel detection process on the first BWP and thus determines that the first BWP is occupied, or may execute the channel detection process on the second BPW and thus determines that the second BWP is idle through the channel detection process. For example, the channel detection unit 830 may perform an LBT process of type 2 on the first BWP and the second BWP. The LBT process may include a channel detection process of 25 μs. The channel detection unit 830 may determine channel states of the first BWP and the second BWP by the channel detection process. The channel state includes an occupied state and an idle state. The occupied state indicates that the BWP is occupied by other device and cannot be used to send and receive information, and the idle state indicates that the BWP is not occupied by other device and can be used to send and receive information.

According to the embodiment of the present disclosure, the channel detection unit 830 may execute the channel detection process on the first BWP before sending PDCCH. In a case that the channel detection unit 830 determines that the first BWP is idle, PDCCH is sent by using the first BWP. In a case that the channel detection unit 830 determines that the first BWP is occupied, the channel detection process is executed on the second BWP. Further, in a case that the channel detection unit 830 determines that the second BWP is idle, and PDCCH is sent by using the second BWP.

Figure 9:
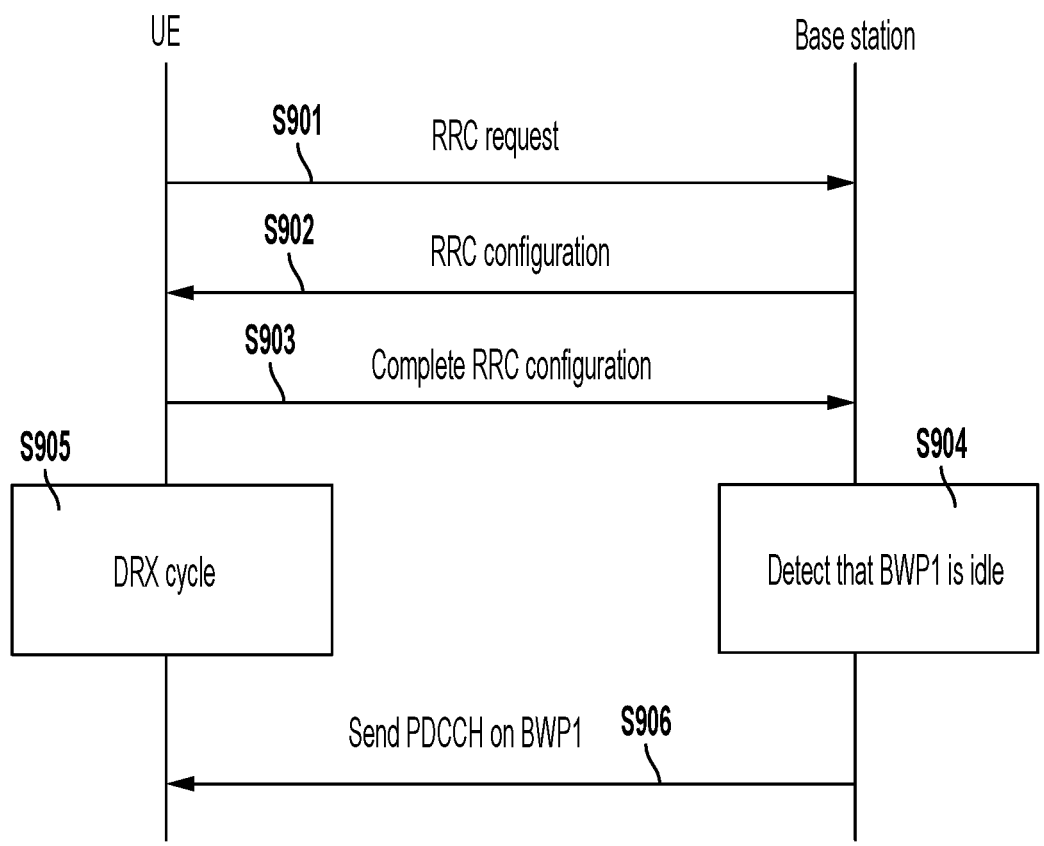
FIG. 9 is a signaling flowchart of sending PDCCH on a BWP in an active state according to an embodiment of the present disclosure.

FIG. 9 is a signaling flowchart of sending PDCCH on a BWP in the active state according to an embodiment of the present disclosure. As shown in FIG. 9, in S901, a user equipment (UE) sends an RRC configuration request to a base station. Subsequently, in S902, the base station sends RRC configurations to the UE. Subsequently, in S903, the UE sends an RRC configuration completion message to the base station. Subsequently, in S904, the base station executes the channel detection process on BWP1 to determine that BWP1 is idle. Subsequently, in S906, the base station sends PDCCH on BWP1. In addition, in S905, the UE detects PDCCH according to the DRX cycle and detects PDCCH on BWP1.

According to the embodiment of the present disclosure, in a case that PDCCH is sent to the user equipment by using the second BWP, the BWP configuration unit 840 may set the second BWP to be in the active state, and set the first BWP to be in the inactive state.

According to the embodiment of the present disclosure, in a case that PDCCH is sent to the user equipment by using the second BWP and the electronic device 800 receives feedback information from the user equipment, the BWP configuration unit 840 may set the second BWP to be in the active state, and set the first BWP to be in the inactive state. The feedback information here may indicate the user equipment detects PDCCH on the second BWP. The feedback information includes but not limited to UCI. The UCI may be the feedback information about PDCCH sent by the electronic device 800 or about downlink data sent subsequently. That is, the feedback information may implicitly indicate the user equipment has detected the PDCCH sent by the electronic device 800.

According to the embodiment of the present disclosure, the BWP configuration unit 840 may set the second BWP to be in the active state in a case that PDCCH is sent to the user equipment by using the second BWP. Further, the electronic device 800 sends PDCCH by using the second BWP and the user equipment does not detect PDCCH (for example, after detection time of a DRX cycle of the user equipment on the second BWP, the electronic device 800 sends PDCCH by using the second BWP). Therefore, the BWP configuration unit 840 may be configured to set the second BWP to be in the active state in a case that the BWP configuration unit 840 sends PDCCH to the user equipment by using the second BWP and receives feedback information from the user equipment.

According to the embodiment of the present disclosure, the electronic device 800 may send information that the second BWP is set to be in the active state and the first BWP is set to be in the inactive state, to the user equipment. Further, the electronic device 800 may send such information to the user equipment via high layer signaling or low layer signaling. For example, the electronic device 800 may send such information to the user equipment via RRC signaling, or may carry such information by DCI carried by PDCCH sent on the second BWP. In addition, the information sent by the electronic device 800 may include: for example, identification information of a new BWP in the active state, or information of 1 bit indicating to switch the default BWP to the BWP in the active state.

According to the embodiment of the present disclosure, in a case that PDCCH is sent to the user equipment by using the second BWP, the electronic device 800 may send information about an updated default BWP to the user equipment. For example, the electronic device 800 may send such information to the user equipment via RRC signaling, or may carry such information by DCI carried by PDCCH sent on the second BWP. In addition, the information sent by the electronic device 800 may include identification information of a new default BWP.

Further, according to the embodiment of the present disclosure, the new default BWP may be any BWP other than the second BWP, and certainly may be the first BWP certainly. That is, the new default BWP may be the BWP originally in the active state, or may be the other BWP originally in the inactive state.

According to the embodiment of the present disclosure, similar to the embodiment in which the second BWP is set to be in the active state and the first BWP is set to be in the inactive state, in a case that PDCCH is sent to the user equipment by using the second BWP and the electronic device 800 receives feedback information from the user equipment, the electronic device 800 may send information about the updated default BWP to the user equipment.

Figure 10:
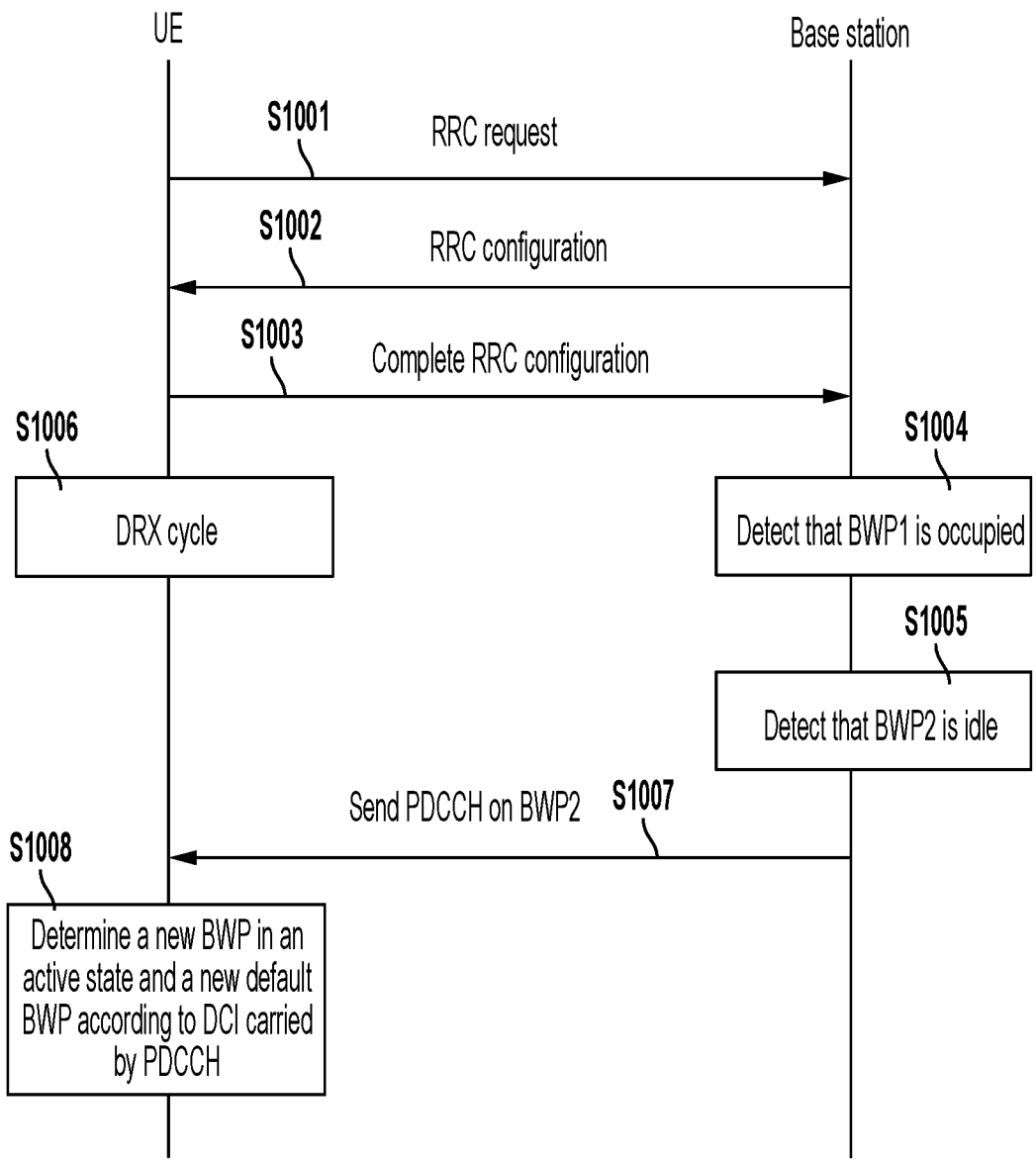
FIG. 10 is a signaling flowchart of sending PDCCH on a default BWP according to an embodiment of the present disclosure.

FIG. 10 is a signaling flowchart of sending PDCCH on a default BWP according to an embodiment of the present disclosure. As shown in FIG. 10, in S1001, a UE sends an RRC configuration request to a base station. Subsequently, in S1002, the base station sends RRC configurations to the UE. Subsequently, in S1003, the UE sends an RRC configuration completion message to the base station. Subsequently, in S1004, the base station executes a channel detection process on BWP1 to determine that BWP1 is occupied. Subsequently, in S1005, the base station executes the channel detection process on BWP2 to determine that BWP2 is idle. Subsequently, in S1007, the base station sends PDCCH to BWP2. In addition, in S1006, the UE detects PDCCH according to a DRX cycle, and detects PDCCH on BWP2 in a case that no PDCCH is detected on BWP1 and BWP1 is determined to be occupied. Subsequently, in S1008, the UE determines a new BWP in the active state and a new default BWP according to DCI carried by PDCCH detected on BWP2. Herein, FIG. 10 shows an example in which the new BWP in the active state and the new default BWP are carried by PDCCH. Practically, the electronic device 800 may carry one or more types of the above information via high layer signaling.

According to the embodiment of the present disclosure, in a case that PDCCH is sent to the user equipment by using the second BWP, the BWP configuration unit 840 may select a new default BWP from multiple BWPs for receiving downlink information configured for the user equipment. Specifically, the BWP configuration unit 840 may select the new default BWP from other BWPs among the multiple BWPs for receiving downlink information configured for the user equipment than the new BWP in the active state. For example, in a case that PDCCH is sent to the user equipment by using the second BWP, the second BWP is set as the new BWP in the active state, and the BWP configuration unit 840 may be configured to select the new default BWP from all BWPs configured for the user equipment other than the second BWP.

According to the embodiment of the present disclosure, the BWP configuration unit 840 may select the default BWP according to a channel idle probability of each of the multiple BWPs detected by the electronic device 800. For example, the channel detection unit 830 may execute the channel detection process on each of the multiple BWPs, and thus may determine the channel idle probability of each BWP. Further, the BWP configuration unit 840 may select a BWP with a highest channel idle probability from the multiple BWPs as the default BWP.

As described above, the electronic device 800 may send PDCCH by using the second BWP in a case that the second BWP is determined to be idle, and thus changes the BWP in the active state and the default BWP of the user equipment.

According to the embodiment of the present disclosure, in a case that the first BWP is occupied and the second BWP is occupied, the electronic device 800 may be configured to send no PDCCH to the user equipment temporarily. According to the embodiment of the present disclosure, in a case that the channel detection unit 830 determines that both the first BWP and the second BWP are occupied, the electronic device 800 may send no PDCCH to the user equipment within a predetermined time period. For example, the electronic device 800 may set a timer in a case that the second BWP is determined to be occupied, and detects a channel state of the first BWP again when the timer expires. Further, in a case that the first BWP is idle, the electronic device 800 may send PDCCH to the user equipment by using the first BWP. In a case that the first BWP is occupied, the electronic device 800 may execute the channel detection process again on the second BWP. In a case that the second BWP is idle, the electronic device 800 may send PDCCH to the user equipment by using the second BWP. Practically, the above embodiments are not intended to limit the present disclosure, and the electronic device 800 may adopt other manners. For example, the electronic device 800 reschedules the user equipment, or sends PDCCH by using the BWP other than the first BWP and the second BWP, and notifies the user equipment of the BWP carrying the PDCCH.

Figure 11:
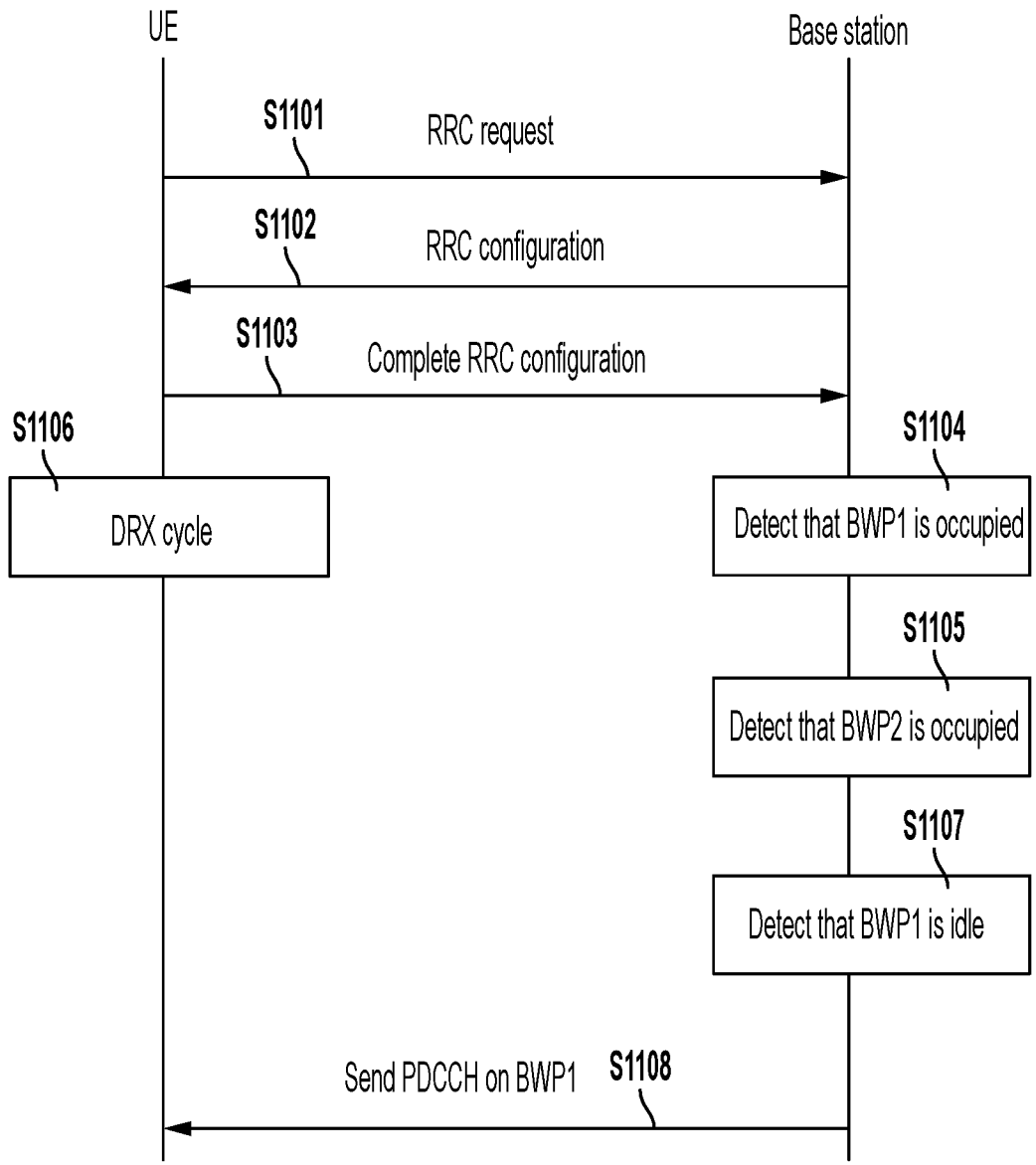
FIG. 11 is a signaling flowchart of sending no PDCCH temporarily according to an embodiment of the present disclosure.

FIG. 11 is a signaling flowchart of sending no PDCCH temporarily according to an embodiment of the present disclosure. As shown in FIG. 11, in S1101, a UE sends an RRC configuration request to a base station. Subsequently, in S1102, the base station sends the RRC configuration to the UE. Subsequently, in S1103, the UE sends an RRC configuration completion message to the base station. Subsequently, in S1104, the base station executes a channel detection process on BWP1 to determine that BWP1 is occupied. Subsequently, in S1105, the base station executes the channel detection process on BWP2 to determine that BWP2 is also occupied. Therefore, the base station sends no PDCCH temporarily. In addition, in S1106, the UE detects PDCCH according to a DRX cycle, detects no PDCCH on both BWP1 and BWP2, and thus enters the sleep time. Subsequently, in S1107, after the predetermined time, the base station executes the channel detection process on BWP1 to determine that BWP1 is idle. Subsequently, in step S1108, the base station sends PDCCH on BWP1. FIG. 11 shows the case that BWP1 is idle after the predetermined time. Practically, alternatively, BWP1 is occupied and BWP2 is idle after the predetermined time, the base station may send PDCCH to the UE by using BWP2 in this case.

As described above, according to the embodiment of the present disclosure, the electronic device 800 may send PDCCH on the BWP in the active state first. In a case that the BWP in the active state of the user equipment is occupied, the electronic device 800 may send PDCCH on the default BWP. In addition, the electronic device 800 may select the default BWP according to the channel idle probability, so that the idle probability of the default BWP becomes higher, thereby improving the probability of successful transmission of PDCCH.

The electronic device 200 according to the embodiment of the present disclosure may function as the user equipment, the electronic device 800 may function as the network side device, that is, the electronic device 800 may provide service for the user equipment 200. Therefore, all embodiments of the user equipment 200 described above adapt to this.

Subsequently, a wireless communication method executed by a user equipment 200 in a wireless communication system and a wireless communication method executed by an electronic device 800 as a network side device according to an embodiment of the present disclosure are described in detail.

Figure 12:
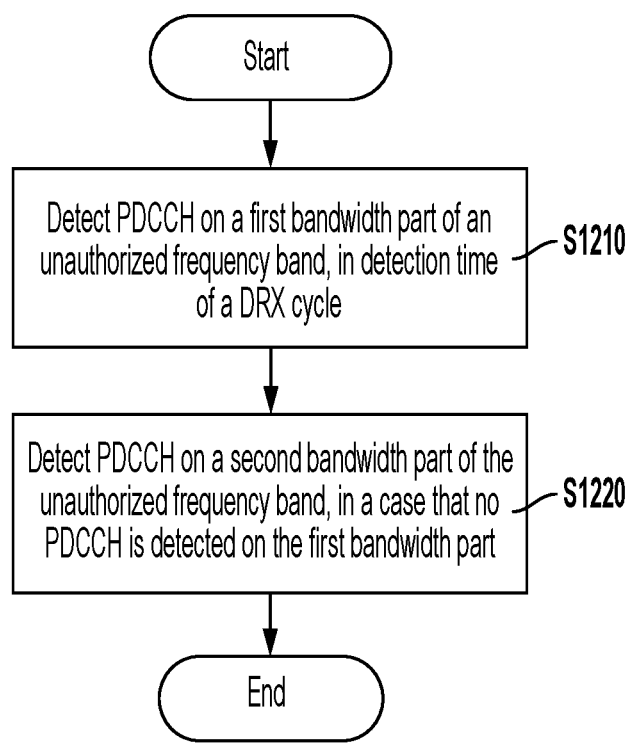
FIG. 12 is a flowchart of a wireless communication method performed by a user equipment according to an embodiment of the present disclosure.

FIG. 12 is a flowchart of a wireless communication method executed by a user equipment 200 in a wireless communication system according to an embodiment of the present disclosure.

As shown in FIG. 12, in step S1210, physical downlink control channel PDCCH is detected on a first bandwidth part of an unauthorized frequency band in detection time of a discontinuous reception DRX cycle.

Subsequently, in step S1220, in a case that no PDCCH is detected on the first bandwidth part, PDCCH is detected on a second bandwidth part of the unauthorized frequency band.

Preferably, the method further includes: setting a counter, where the counter represents the number of times of the user equipment to continuously detect no PDCCH on the first bandwidth part; and detecting PDCCH on the second bandwidth in a case that a value of the counter is greater than a predetermined threshold.

Preferably, the first bandwidth part and the second bandwidth part are bandwidth parts for receiving downlink information configured for the user equipment. The first bandwidth part is in an active state, and the second bandwidth part is in an inactive state.

Preferably, the method further includes: in a case that PDCCH is detected on the second bandwidth part, setting the second bandwidth part to be in an active state, and setting the first bandwidth part to be in an inactive state.

Preferably, the method further includes: sending feedback information in a case that PDCCH is detected on the second bandwidth part.

Preferably, the method further includes: detecting PDCCH on the second bandwidth part in a next DRX cycle of the DRX cycle in a case that PDCCH is detected on the second bandwidth part.

Preferably, the method further includes: detecting PDCCH on the first bandwidth part in a next DRX cycle of the DRX cycle in a case that no PDCCH is detected on the second bandwidth part.

Preferably, the method further includes: entering sleep time of the DRX cycle in a case that no PDCCH is detected on the second bandwidth part.

Preferably, the second bandwidth part is a default bandwidth part configured for the user equipment, and the method further includes: receiving information about the default bandwidth part from the network side device.

Preferably, the method further includes: receiving information about an updated default bandwidth part from the network side device in a case that PDCCH is detected on the second bandwidth part.

Preferably, the method further includes: determining that the first bandwidth part is occupied through a channel detection process in a case that no PDCCH is detected on the first bandwidth part; and detecting PDCCH on the second bandwidth part in a case that the first bandwidth part is occupied.

Preferably, the method further includes: executing a channel detection process after detection time of the DRX cycle.

Preferably, the method further includes: entering sleep time of the DRX cycle in a case that no PDCCH is detected on the first bandwidth part and the first bandwidth part is not occupied.

According to the embodiment of the present disclosure, the above method may be performed by the user equipment 200 according to the embodiment of the present disclosure. Therefore, all embodiments of the user equipment 200 described above adapt to this.

Subsequently, a wireless communication method executed by an electronic device 800 as a network side device in a wireless communication system according to an embodiment of the present disclosure is described in detail.

Figure 13:
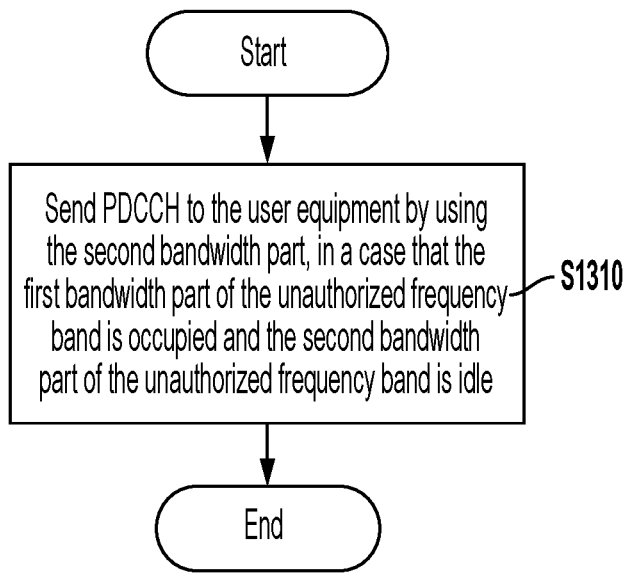
FIG. 13 is a flowchart of a wireless communication method performed by a network side device according to an embodiment of the present disclosure.

FIG. 13 is a flowchart of a wireless communication method executed by an electronic device 800 as a network side device in a wireless communication system according to an embodiment of the present disclosure.

As shown in FIG. 13, in step S1310, in a case that the first bandwidth part of the unauthorized frequency band is occupied and the second bandwidth part of the unauthorized frequency band is idle, PDCCH is sent to a user equipment by using the second bandwidth part.

Preferably, the method further includes: determining that the first bandwidth part is occupied through a channel detection process; and determining that the second bandwidth part is idle through a channel detection process.

Preferably, the first bandwidth part and the second bandwidth part are bandwidth parts for receiving downlink information configured for the user equipment. The first bandwidth part is in an active state, and the second bandwidth part is in an inactive state.

Preferably, the method further includes: setting the second bandwidth part to be in an active state, and setting the first bandwidth part to be in an inactive state, in a case that PDCCH is sent to the user equipment by using the second bandwidth part.

Preferably, the method further includes: setting the second bandwidth part to be in the active state and setting the first bandwidth part to be in the inactive state, in a case that PDCCH is sent to the user equipment by using the second bandwidth part and feedback information is received from the user equipment.

Preferably, the second bandwidth part is a default bandwidth part configured for the user equipment, and the method further includes: sending information about the default bandwidth part to the user equipment.

Preferably, the method further includes: sending information about an updated default bandwidth part to the user equipment, in a case that PDCCH is sent to the user equipment by using the second bandwidth part.

Preferably, the method further includes: sending the information about the updated default bandwidth part to the user equipment, in a case that PDCCH is sent to the user equipment by using the second bandwidth part and feedback information is received from the user equipment.

Preferably, the method further includes: selecting the default bandwidth part from multiple bandwidth parts for receiving downlink information configured for the user equipment.

Preferably, the method further includes: selecting the default bandwidth part according to a channel idle probability of each of the multiple bandwidth parts detected by the electronic device.

Preferably, the method includes: re-executing a channel detection process on the first bandwidth part and the second bandwidth part after a predetermined time, in a case that the first bandwidth part is occupied and the second bandwidth part is occupied; sending PDCCH to the user equipment by using the first bandwidth part in a case that the first bandwidth part is idle; and sending PDCCH to the user equipment by using the second bandwidth part in a case that the first bandwidth part is occupied and the second bandwidth part is idle.

According to the embodiment of the present disclosure, the above method may be performed by the electronic device 800 according to the embodiment of the present disclosure. Therefore, all embodiments of the electronic device 800 described above adapt to this.

Figure 14A:
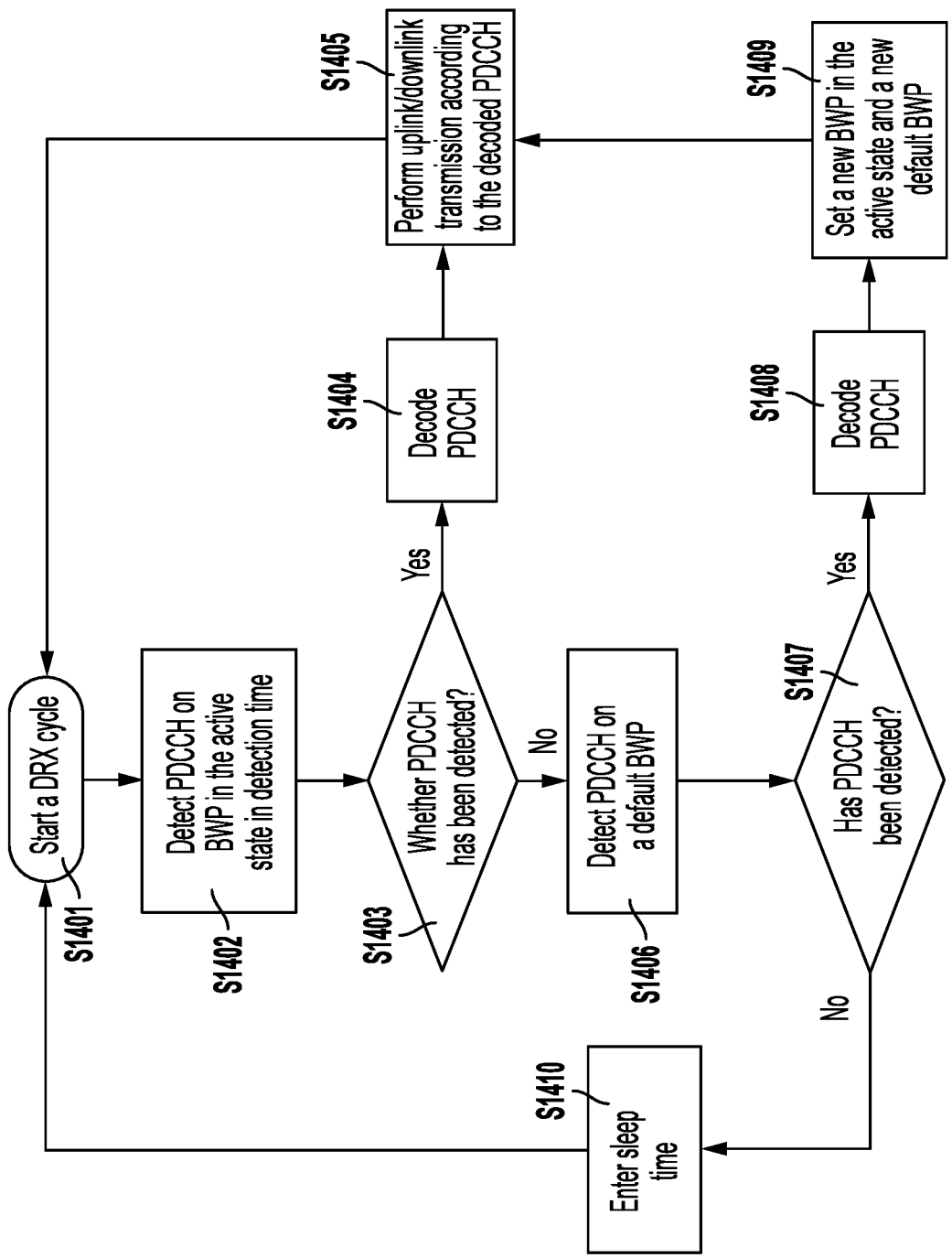
FIG. 14(a) is a flowchart of a wireless communication method performed by a user equipment according to an embodiment of the present disclosure.

A flow of a wireless communication method according to an embodiment of the present disclosure is described with reference to FIG. 14(*a*) to FIG. 16(*b*) hereinafter.

Figure 14B:
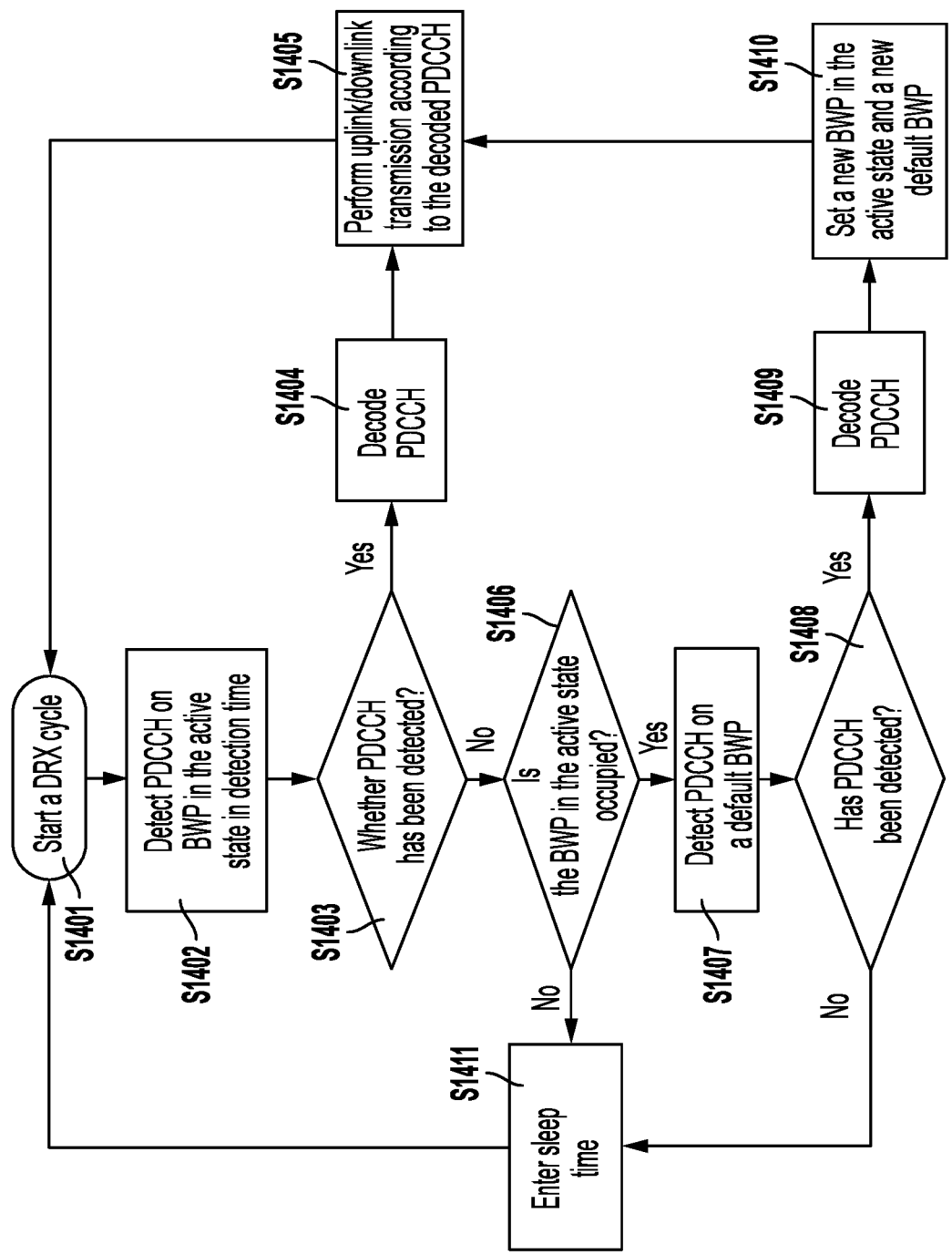
FIG. 14(b) is a flowchart of a wireless communication method performed by a user equipment according to an embodiment of the present disclosure.

FIG. 14(*a*) is a flowchart of a wireless communication method executed by a user equipment 200 in a wireless communication system according to an embodiment of the present disclosure.

As shown in FIG. 14(*a*), in step S1401, any DRX cycle is started.

Subsequently, in step S1402, in detection time of the DRX cycle, the user equipment 200 detects PDCCH on BWP in an active state (for example, the first BWP described above, BWP1).

Subsequently, in step S1403, the user equipment 200 determines whether PDCCH is detected on the BWP in the active state in the detection time of the DRX cycle.

Subsequently, if a positive determination is made in step S1403, that is, the user equipment 200 has detected PDCCH on the BWP in the active state in the detection time of the DRX cycle, the method proceeds to step S1404. In step S1404, the user equipment 200 decodes PDCCH.

Subsequently, in step S1405, the user equipment 200 performs uplink/downlink transmission with a network side device according to a decoding result of PDCCH. After the uplink/downlink transmission, the method returns to step S1401. That is, the user equipment 200 continuously detects PDCCH on the BWP in the active state in the DRX cycle.

In a case that a negative determination is made in step S1403, that is, no PDCCH is detected by the user equipment 200 on the BWP in the active state in the detection time of the DRX cycle, the method proceeds to step S1406.

In step S1406, the user equipment 200 detects PDCCH on the default BWP (for example the second BWP described above, BWP2) of the user equipment 200 in the detection time of the DRX cycle.

Subsequently, in step S1407, the user equipment 200 determines whether PDCCH is detected on the default BWP.

In a case that a negative determination is made in step S1407, that is, the user equipment 200 detects no PDCCH on the default BWP, the method proceeds to step S1410, that is, entering sleep time of the DRX cycle. Then, the method returns to step S1401, that is, the user equipment 200 continuously detects PDCCH on the BWP (for example, the first BWP described above, BWP1) in the active state in the DRX cycle.

In a case that a positive determination is made in step S1407, that is, the user equipment 200 has detected PDCCH on the default BWP, the method proceeds to step S1408. In step S1408, the user equipment 200 decodes the PDCCH detected on the default BWP.

Subsequently, in step S1409, the user equipment 200 may set a new BWP in the active state and a new default BWP. Then, the method proceeds to step S1405, that is, the user equipment 200 performs uplink/downlink transmission with a network side device according to a decoding result of the PDCCH detected on the default BWP.

FIG. 14(*b*) is a flowchart of a wireless communication method executed by a user equipment 200 in a wireless communication system according to an embodiment of the present disclosure. As compared with FIG. 14(*a*), a step of determining whether the BWP in the active state is occupied is added in FIG. 14(*b*).

As shown in FIG. 14(*b*), in step S1401, any DRX cycle is started.

Subsequently, in step S1402, the user equipment 200 detects PDCCH on the BWP in the active state (for example, the first BWP described above, BWP1) in detection time of the DRX cycle.

Subsequently, in step S1403, the user equipment 200 determines whether PDCCH is detected on the BWP in the active state in the detection time of the DRX cycle.

Subsequently, in a case that a positive determination is made in step S1403, that is, the user equipment 200 has detected PDCCH on the BWP in the active state in the detection time of the DRX cycle, the method proceeds to step S1404. In step S1404, the user equipment 200 decodes PDCCH.

Subsequently, in step S1405, the user equipment 200 performs uplink/downlink transmission with a network side device according to a decoding result of PDCCH. After the uplink/downlink transmission, the method returns to step S1401, that is, the user equipment 200 continuously detects PDCCH on the BWP in the active state in the DRX cycle.

In a case that a negative determination is made in step S1403, that is, the user equipment 200 detects no PDCCH on the BWP in the active state in the detection time of the DRX cycle, the method proceeds to step S1406.

In step S1406, the user equipment 200 determines whether the BWP in the active state is occupied.

Subsequently, in a case that a negative determination is made in step S1406, that is, the BWP in the active state is not occupied, the method proceeds to step S1411.

In step S1411, the user equipment 200 enters sleep time of the DRX cycle, and the method returns to step S1401. That is, the user equipment 200 continuously detects PDCCH on the BWP in the active state (for example the first BWP described above, BWP1) in the DRX cycle.

In a case that a positive determination is made in step S1406, that is, the BWP in the active state is occupied, the method proceeds to step S1407. In step S1407, the user equipment 200 detects PDCCH on the default BWP (for example the second BWP descried above, BWP2) in the detection time of the DRX cycle.

Subsequently, in step S1408, the user equipment 200 determines whether PDCCH is detected on the default BWP.

In a case that a negative determination is made in step S1408, that is, the user equipment 200 detects no PDCCH on the default BWP, the method proceeds to step S1411, that is, entering sleep time of the DRX cycle. Then, the method returns to step S1401, that is, the user equipment 200 continuously detects PDCCH on the BWP in the active state (for example, the first BWP described above, BWP1) in the DRX cycle.

In a case that a positive determination is made in step S1408, that is, the user equipment 200 has detected PDCCH on the default BWP, the method proceeds to step S1409. In step S1409, the user equipment 200 decodes the PDCCH detected on the default BWP.

Subsequently, in step S1410, the user equipment 200 may set a new BWP in the active state and a new default BWP. Then, the method proceeds to step S1405, that is, the user equipment 200 performs uplink/downlink transmission with the network side device according to a decoding result of the PDCCH detected on the default BWP.

FIG. 14(*a*) and FIG. 14(*b*) schematically show flowcharts of the method executed by the user equipment 200 according to the embodiment of the present disclosure. Those skilled in the art may change FIG. 14(*a*) and FIG. 14(*b*) without departing from the spirit and scope of the present disclosure.

According to the embodiment of the present disclosure, the above method may be performed by the user equipment 200 according to the embodiment of the present disclosure. Therefore, all embodiments of the user equipment 200 descried above adapt to this.

Figure 15:
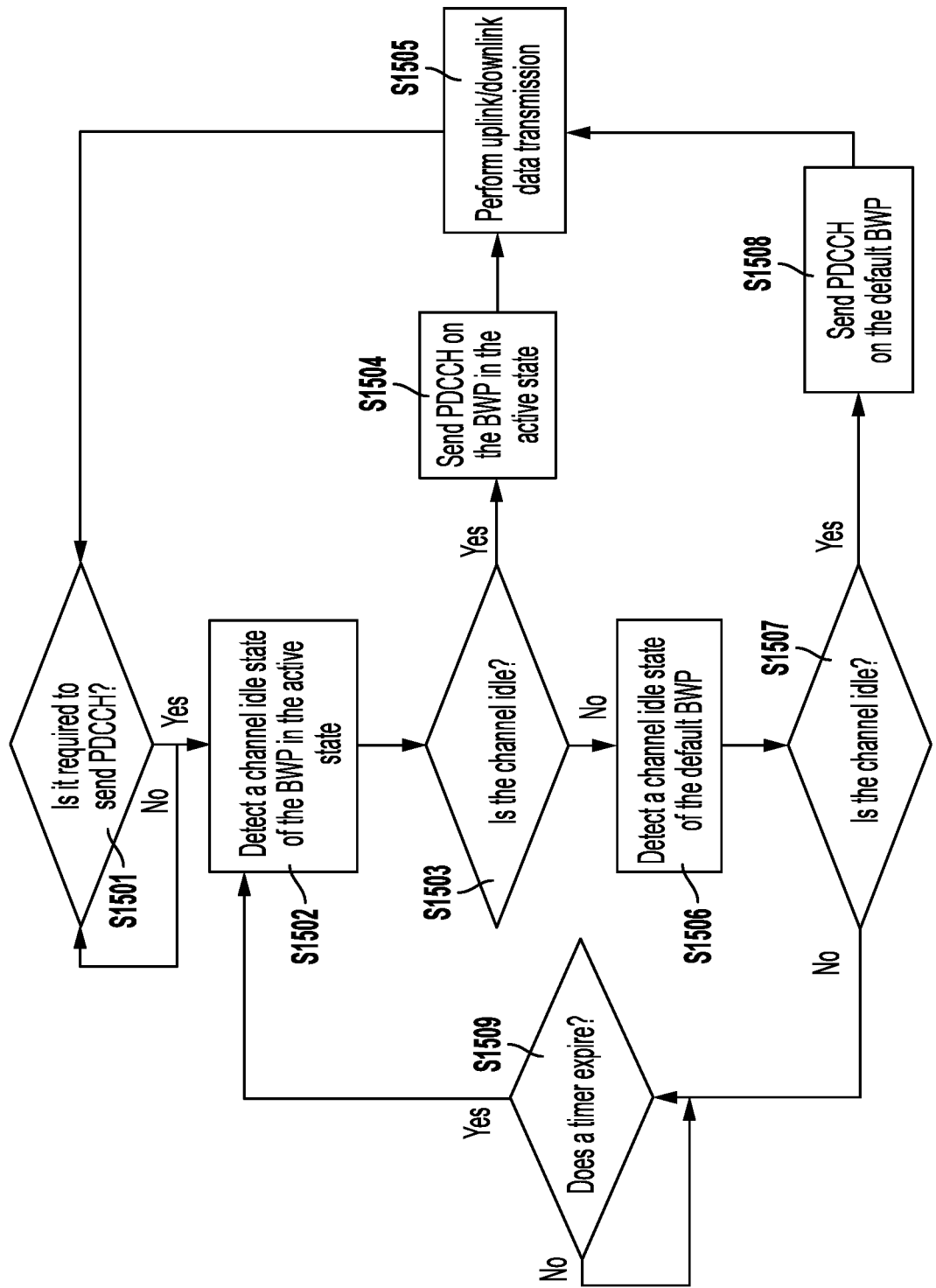
FIG. 15 is a flowchart of a wireless communication method performed by a network side device according to an embodiment of the present disclosure.

FIG. 15 is a flowchart of a wireless communication method executed by a network side device in a wireless communication system according to an embodiment of the present disclosure.

As shown in FIG. 15, in step S1501, an electronic device 800 as a network side device determines whether it is required to send PDCCH for a certain user equipment. The electronic device 800 continuously determines whether it is required to send PDCCH until it is determined that PDCCH is required to be sent in step S1501, then the method proceeds to step S1502.

In step S1502, the electronic device 800 detects a channel idle state of the BWP in the active state (for example, the first BWP described above, BWP1) of the user equipment.

In step S1503, the electronic device 800 determines whether the BWP in the active state of the user equipment is idle.

In a case that a positive determination is made in step S1503, that is, the BWP in the active state of the user equipment is idle, the method proceeds to step S1504.

In step S1504, the electronic device 800 sends PDCCH on the BWP in the active state of the user equipment.

Subsequently, in step S1505, the electronic device 800 may perform uplink/downlink transmission with the user equipment according to the sent PDCCH. Then, the method returns to step S1501, that is, the electronic device 800 continuously determines whether it is required to send PDCCH to the user equipment.

In a case that a negative determination is made in step S1503, that is, the BWP in the active state of the user equipment is occupied, the method proceeds to step S1506.

In step S1506, the electronic device 800 detects a channel idle state of the default BWP of the user equipment.

Subsequently, in step S1507, the electronic device 800 determines whether a channel of the default BWP (for example the second BWP described above, BWP2) of the user equipment is idle.

In a case that a positive determination is made in step S1507, that is, the channel of the default BWP of the user equipment is idle, the method proceeds to step S1508. That is, the electronic device 800 sends PDCCH on the default BWP of the user equipment. Here, the electronic device 800 may send a new BWP in the active state and/or a new default BWP to the user equipment. Subsequently, the method returns to step S1505, that is, the electronic device 800 may perform uplink/downlink transmission with the user equipment according to the sent PDCCH. Then, the method returns to step S1501.

In a case that a negative determination is made in step S1507, that is, the default BWP of the user equipment is occupied, the method proceeds to step S1509. In step S1509, the electronic device 800 starts a timer, and determines whether the timer expires. When the timer expires, the method proceeds to step S1502. That is, the electronic device 800 continuously detects a channel idle state on the BWP in the active state.

FIG. 15 schematically shows a flowchart of a method performed by an electronic device 800 according to the embodiment of the present disclosure. Those skilled in the art may change FIG. 15 without departing from the spirit and scope of the present disclosure. In a case that the electronic device 800 detects that the default BWP is occupied, PDCCH may be sent by using BWPs other than the BWP in the active state and the default BWP.

According to the embodiment of the present disclosure, the above method may be performed by the electronic device 800 according to the embodiment of the present disclosure. Therefore, all embodiments of the electronic device 800 described above adapt to this.

Figure 16A:
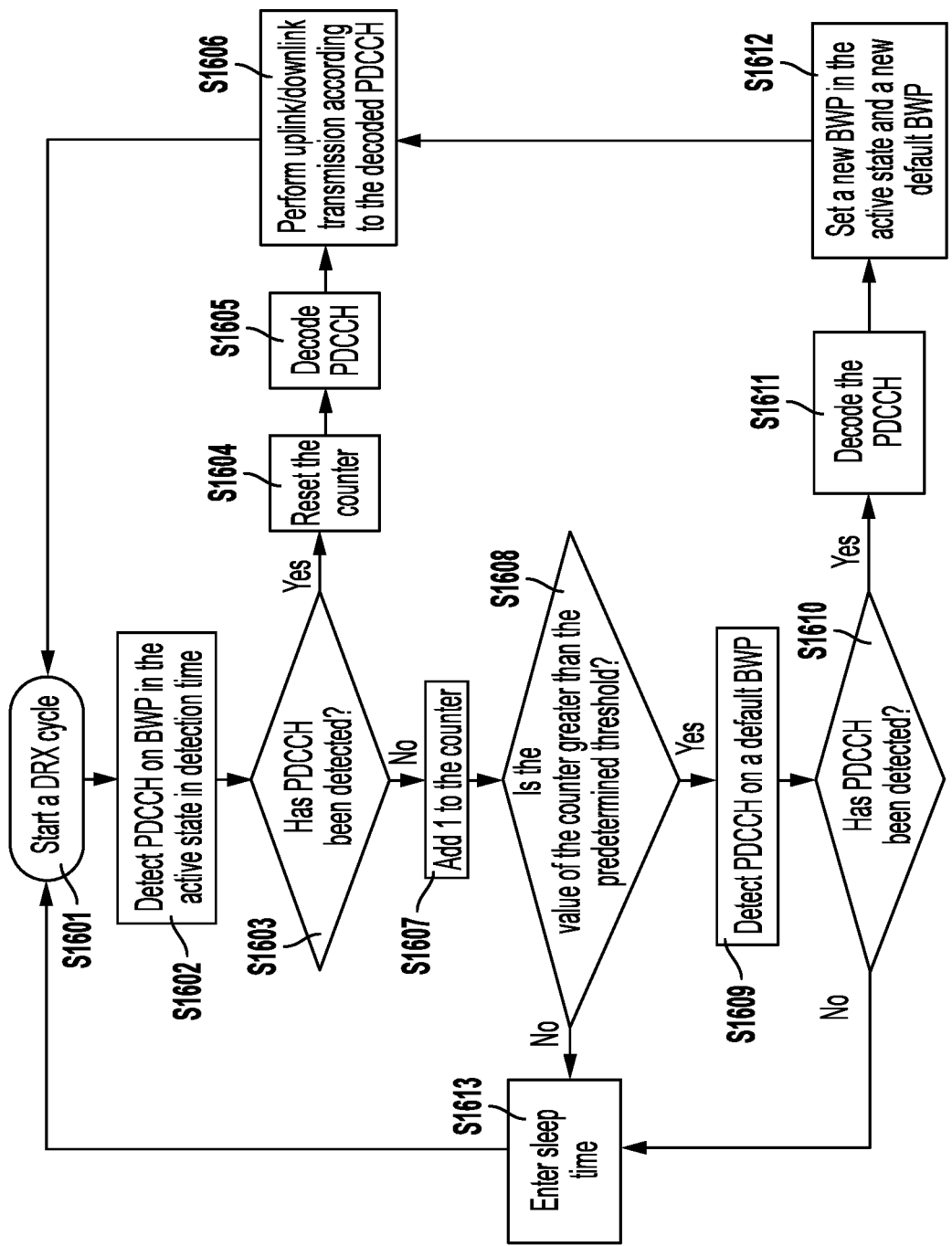
FIG. 16(a) is a flowchart of a wireless communication method performed by a user equipment according to an embodiment of the present disclosure.

FIG. 16(a) is a flowchart of a wireless communication method performed by a user equipment 200 in a wireless communication system according to another embodiment of the present disclosure. As compared with FIG. 14(a), a process of setting a counter to count the number of times of the user equipment 200 to continuously detect no PDCCH on the BWP in the active state is added. An initial value of the counter is zero. The counter is reset each time the user equipment 100 detects PDCCH on the BWP in the active state.

As shown in FIG. 16(a), in step S1601, any DRX cycle is started.

Subsequently, in step S1602, the user equipment 200 detects PDCCH on the BWP in the active state (for example the first BWP described above, BWP1) in detection time of the DRX cycle.

Subsequently, in step S1603, the user equipment 200 determines whether PDCCH is detected on the BWP in the active state in the detection time of the DRX cycle.

Subsequently, in a case that a positive determination is made in step S1603, that is, the user equipment 200 has detected PDCCH on the BWP in the active state in the detection time of the DRX cycle, the method proceeds to step S1604. In step S1604, the user equipment 200 resets the counter.

Subsequently, in step S1605, the user equipment 200 decodes PDCCH.

Subsequently, in step S1606, the user equipment 200 performs uplink/downlink transmission with a network side device according to a decoding result of the PDCCH. After the uplink/downlink transmission, the method returns to step S1601, that is, the user equipment 200 continuously detects PDCCH on the BWP in the active state in the DRX cycle.

In a case that a negative determination is made in step S1603, that is, the user equipment 200 detects no PDCCH on the BWP in the active state in the detection time of the DRX cycle, the method proceeds to step S1607.

In step S1607, the user equipment 200 adds 1 to a value of the counter.

Subsequently, in step S1608, the user equipment 200 determines whether the value of the counter is greater than a predetermined threshold.

In a case that a negative determination is made in step S1608, that is, the value of the counter is not greater than the predetermined threshold, the method proceeds to step S1613. In step S1613, the user equipment 200 enters sleep time of the DRX cycle. Then, the method returns to step S1601, that is, PDCCH is detected on the BWP in the active state in the DRX cycle.

In a case that a positive determination is made in step S1608, that is, the value of the counter is greater than the predetermined threshold, the method proceeds to step S1609. In step S1609, the user equipment 200 detects PDCCH on the default BWP (for example the second BWP described above, BWP2) in detection time of the DRX cycle.

Subsequently, in step S1610, the user equipment 200 determines whether PDCCH is detected on the default BWP.

In a case that a negative determination is made in step S1610, that is, the user equipment 200 detects no PDCCH on the default BWP, the method proceeds to step S1613, that is, entering sleep time of the DRX cycle. Then, the method returns to step S1601, that is, the user equipment 200 continuously detects PDCCH on the BWP in the active state (for example the first BWP described above, BWP1) in the DRX cycle.

In a case that a positive determination is made in step S1610, that is, the user equipment 200 has detected PDCCH on the default BWP, the method proceeds to step S1611. In step S1611, the user equipment 200 decodes the PDCCH detected on the default BWP.

Subsequently, in step S1612, the user equipment 200 may set a new BWP in the active state and a new default BWP. Then, the method proceeds to step S1606, that is, the user equipment 200 performs uplink/downlink transmission with the network side device according to a decoding result of the PDCCH detected on the default BWP.

Figure 16B:
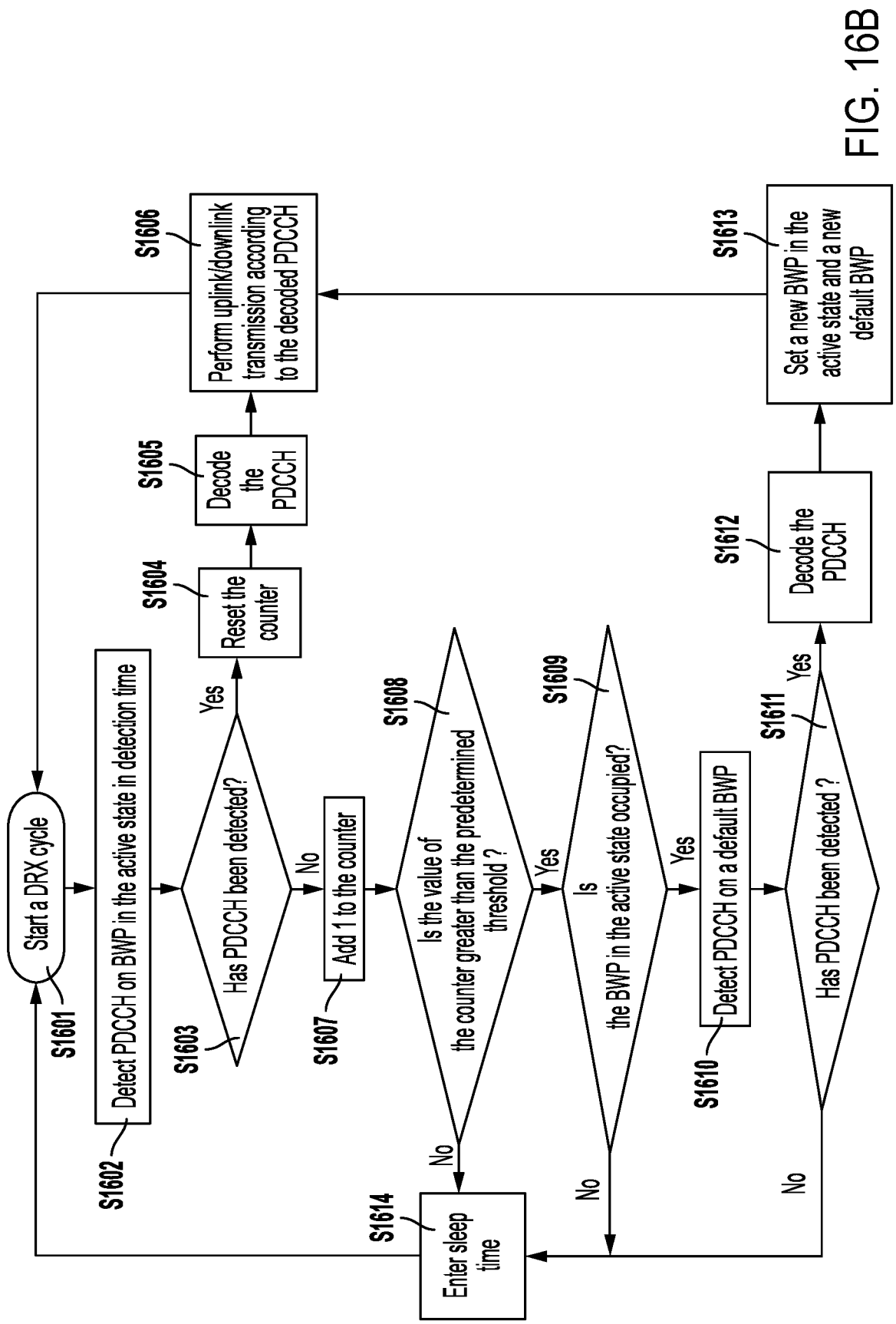
FIG. 16(b) is a flowchart of a wireless communication method performed by a user equipment according to an embodiment of the present disclosure.

FIG. 16(b) is a flowchart of a wireless communication method performed by a user equipment 200 in a wireless communication system according to another embodiment of the present disclosure. As compared with FIG. 14(a), steps of setting a counter to count the number of times of the user equipment 200 to continuously detect no PDCCH on the BWP in the active state and determining whether the BWP in the active state is occupied are added in FIG. 16(b). An initial value of the counter is zero. The counter is reset each time the user equipment 100 has detected PDCCH on the BWP in the active state.

As shown in FIG. 16(b), in step S1601, any DRX cycle is started.

Subsequently, in step S1602, the user equipment 200 detects PDCCH on the BWP in the active state (for example the first BWP described above, BWP1) in detection time of the DRX cycle.

Subsequently, in step S1603, the user equipment 200 determines whether PDCCH is detected on the BWP in the active state in the detection time of the DRX cycle.

Subsequently, in a case that a positive determination is made in step S1603, that is, the user equipment 200 has detected PDCCH on the BWP in the active state in the detection time of the DRX cycle, the method proceeds to step S1604. In step S1604, the user equipment 200 resets the counter.

Subsequently, in step S1605, the user equipment 200 decodes the PDCCH.

Subsequently, in step S1606, the user equipment 200 performs uplink/downlink transmission with the network side device according to a decoding result of the PDCCH. After the uplink/downlink transmission, the method returns to step S1601, that is, the user equipment 200 continuously detects PDCCH on the BWP in the active state in the DRX cycle.

In a case that a negative determination is made in step S1603, that is, the user equipment 200 detects no PDCCH on the BWP in the active state in the detection time of the DRX cycle, the method proceeds to step S1607.

In step S1607, the user equipment 200 adds 1 to the value of the counter.

Subsequently, in step S1608, the user equipment 200 determines whether the value of the counter is greater than a predetermined threshold.

In a case that a negative determination is made in step S1608, that is, the value of the counter is not greater than the predetermined threshold, the method proceeds to step S1614. In step S1614, the user equipment 200 enters sleep time of the DRX cycle, then the method returns to step S1601. That is, PDCCH is continuously detected on the BWP in the active state in the DRX cycle.

In a case that a positive determination is made in step S1608, that is, the value of the counter is greater than the predetermined threshold, the method proceeds to step S1609. In step S1609, the user equipment 200 determines whether the BWP in the active state is occupied.

Subsequently, in a case that a negative determination is made in step S1609, that is, the BWP in the active state is not occupied, the method proceeds to step S1614. That is, the user equipment 200 enters sleep time of the DRX cycle, the method returns to step S1601.

In a case that a positive determination is made in step S1609, that is, the BWP in the active state is occupied, the method proceeds to step S1610. In step S1610, the user equipment 200 detects PDCCH on the default BWP (for example, the second BWP described above, BWP2) in detection time of the DRX cycle.

Subsequently, in step S1611, the user equipment 200 determines whether PDCCH is detected on the default BWP.

In a case that a negative determination is made in step S1611, that is, the user equipment 200 detects no PDCCH on the default BWP, the method processes to step S1614, that is, entering sleep time of the DRX cycle. Then, the method returns to step S1601, that is, the user equipment 200 continuously detects PDCCH on the BWP in the active state (for example the first BWP described above, BWP1) in the DRX cycle.

In a case that a positive determination is made in step S1611, that is, the user equipment 200 has detected PDCCH on the default BWP, the method proceeds to step S1612. In step S1612, the user equipment 200 decodes the PDCCH detected on the default BWP.

Subsequently, in step S1613, the user equipment 200 may set a new BWP in the active state and a new default BWP. Then, the method proceeds to step S1606, that is, the user equipment 200 performs uplink/downlink transmission with the network side device according to a decoding result of the PDCCH detected on the default BWP.

FIG. 16(a) and FIG. 16(b) schematically show flowcharts of the method performed by the user equipment 200 according to the embodiment of the present disclosure. Those skilled in the art may change FIG. 16(a) and FIG. 16(b) without departing from the spirit and scope of the present disclosure.

According to the embodiment of the present disclosure, the above method may be performed by the user equipment 200 according to the embodiment of the present disclosure. All embodiments of the user equipment 200 described above adapt to this.

The technology of the present disclosure may be applied to various products.

The network side device may be implemented as any type of TRP. The TRP may have sending and receiving functions. For example, the TRP may receive information from a user equipment and a base station device, and may send information to the user equipment and the base station device. In a typical example, the TRP may provide services for the user equipment, and is controlled by the base station device. Further, the TRP may have a similar structure as the base station device described below, or may have only a structure related to information sending and reception in the base station device.

The network side device may be implemented as any type of base station device, such as a macro eNB and a small eNB, and may also be implemented as any type of gNB (a base station in a 5G system). The small eNB any be an eNB covering a cell smaller than a macro cell, such as a pico eNB, a micro eNB and a home (femto) eNB. Alternatively, the base station may be implemented as any other type of base station, such as NodeB and a base station transceiver station (BTS). The base station may include: a body configured to control wireless communication (also referred to as a base station device); and one or more remote radio head end (RRH) located at a place different from the body.

The user equipment may be a mobile terminal (for example a smartphone, a tablet personal computer (PC), a notebook PC, a portable game terminal, a portable/dongle mobile router and a digital camera) or a vehicle terminal (such as a vehicle navigation device). The user equipment may be implemented as a terminal performing machine to machine (M2M) communication (also referred to as a machine type communication (MTC) terminal). In addition, the user equipment may be a wireless communication module (for example an integrated circuit module including a single chip) installed in each of the user equipments.

Application Examples of the Base Station

First Application Example

Figure 17:
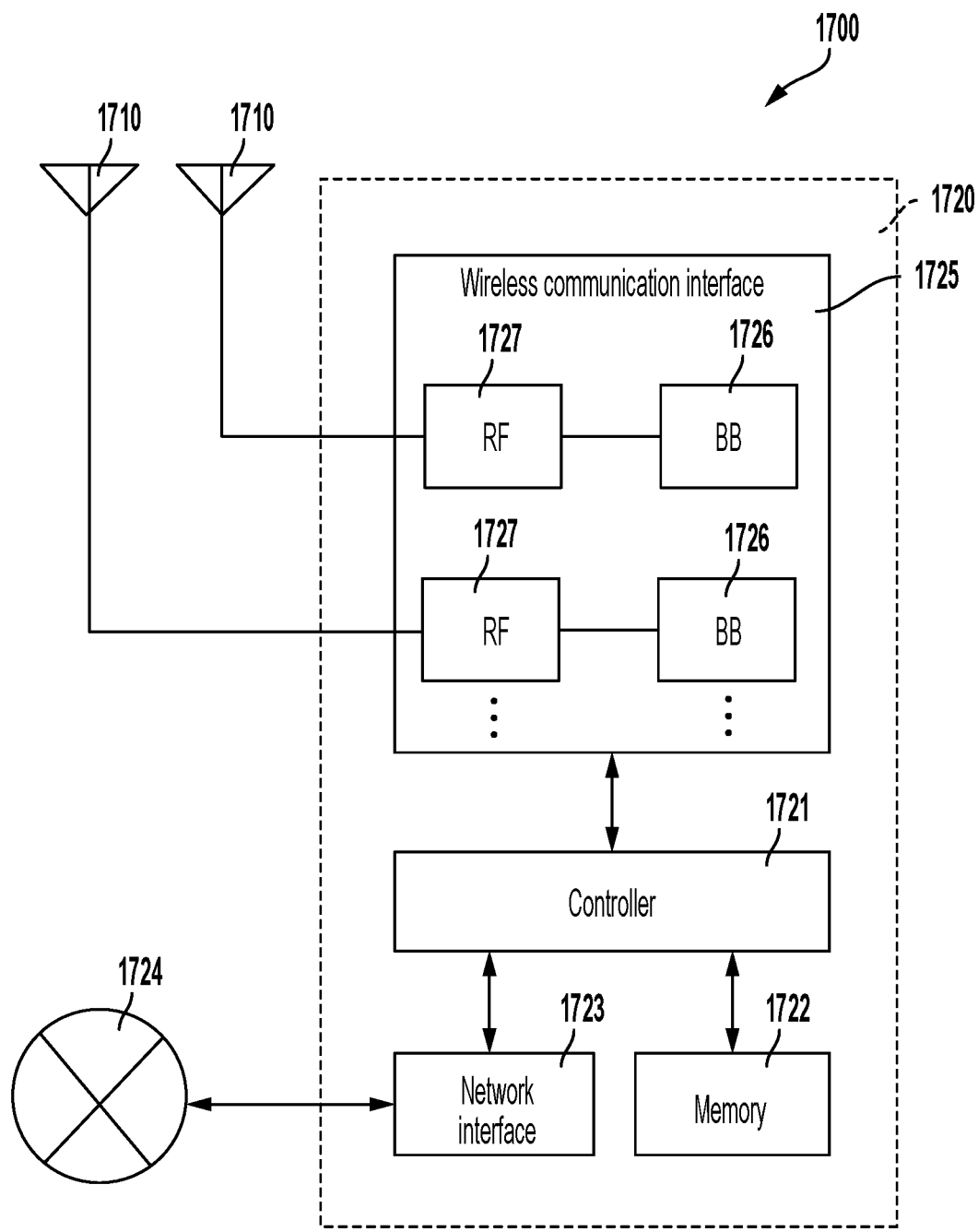
FIG. 17 is a block diagram of a first example of a schematic configuration of an evolved Node B (eNB)

FIG. 17 is a block diagram showing a first example of a schematic configuration of an eNB to which the technology of the present disclosure may be applied. An eNB 1700 includes one or more antennas 1710 and a base station device 1720. The base station device 1720 and each of the antennas 1710 may be connected with each other via an RF cable.

Each of the antennas 1710 includes one or more antenna elements (such as multiple antenna elements included in a multiple-input multiple-output (MIMO) antenna), and is used for sending and receiving a radio signal by the base station device 1720. The eNB 1700 may include the multiple antennas 1710, as shown in FIG. 17. For example, the multiple antennas 1710 may be compatible with multiple frequency bands used by the eNB 1700. Although FIG. 17 illustrates an example in which the eNB 1700 includes multiple antennas 1710, the eNB 1700 may also include a single antenna 1710.

The base station device 1720 includes a controller 1721, a memory 1722, a network interface 1723, and a wireless communication interface 1725.

The controller 1721 may be a CPU or a DSP and control various functions of higher layers of the base station device 1720. For example, the controller 1721 generates a data packet based on data in a signal processed by the wireless communication interface 1725, and transfers the generated packet via a network interface 1723. The controller 1721 may bundle data from multiple baseband processors to generate bundled packet, and transfer the generated bundled packet. The controller 1721 may have logical functions of performing control such as radio resource control, radio bearer control, mobility management, admission control, and scheduling. The control may be performed in conjunction with an adjacent eNB or a core network node. The memory 1722 includes RAM and ROM, and stores a program that is executed by the controller 1721, and various types of control data (such as a terminal list, transmission power data, and scheduling data).

The network interface 1723 is a communication interface for connecting the base station device 1720 to a core network 1724. The controller 1721 may communicate with a core network node or another eNB via the network interface 1723. In that case, the eNB 1700 and the core network node or the other eNB may be connected to each other through a logical interface (such as an S1 interface and an X2 interface). The network interface 1723 may also be a wired communication interface or a wireless communication interface for radio backhaul. If the network interface 1723 is a wireless communication interface, it may use a higher frequency band for wireless communication than a frequency band used by the wireless communication interface 1725.

The wireless communication interface 1725 supports any cellular communication scheme (such as Long Term Evolution (LTE) and LTE-Advanced), and provides wireless connection to a terminal positioned in a cell of the eNB 1700 via the antenna 1710. The wireless communication interface 1725 may typically include, for example, a base band (BB) processor 1726 and an RF circuit 1727. The BB processor 1726 may perform, for example, coding/decoding, modulation/demodulation and multiplexing/de-multiplexing, and perform various types of signal processes of the layers (for example L1, media access control (MAC), radio link control (RLC) and packet data convergence protocol (PDCP)). Instead of the controller 1721, the BB processor 1726 may have a part or all of the above-described logical functions. The BB processor 1726 may be a memory that stores the communication control program, or a module that includes a processor and related circuitry configured to perform the program. The function of the BB processor 1726 may be changed when the programs are updated. The module may be a card or a blade that is inserted into a slot of the base station device 1720. Alternatively, the module may be a chip that is mounted on the card or the blade. Meanwhile, the RF circuit 1727 may include, for example, a frequency mixer, a filter and an amplifier, and send and receive a radio signal via the antenna 1710.

As shown in FIG. 17, the wireless communication interface 1725 may include multiple BB processors 1726. For example, multiple BB processors 1726 may be compatible with multiple frequency bands used by the eNB 1700. As shown in FIG. 17, the wireless communication interface 1725 may include multiple RF circuits 1727. For example, the multiple RF circuits 1727 may be compatible with multiple antenna elements. Although an example in which the wireless communication interface 1725 includes multiple BB processors 1726 and multiple RF circuits 1727 is shown in FIG. 17, the wireless communication interface 1725 may also include a single BB processor 1726 or a single RF circuit 1727.

Second Application Example

Figure 18:
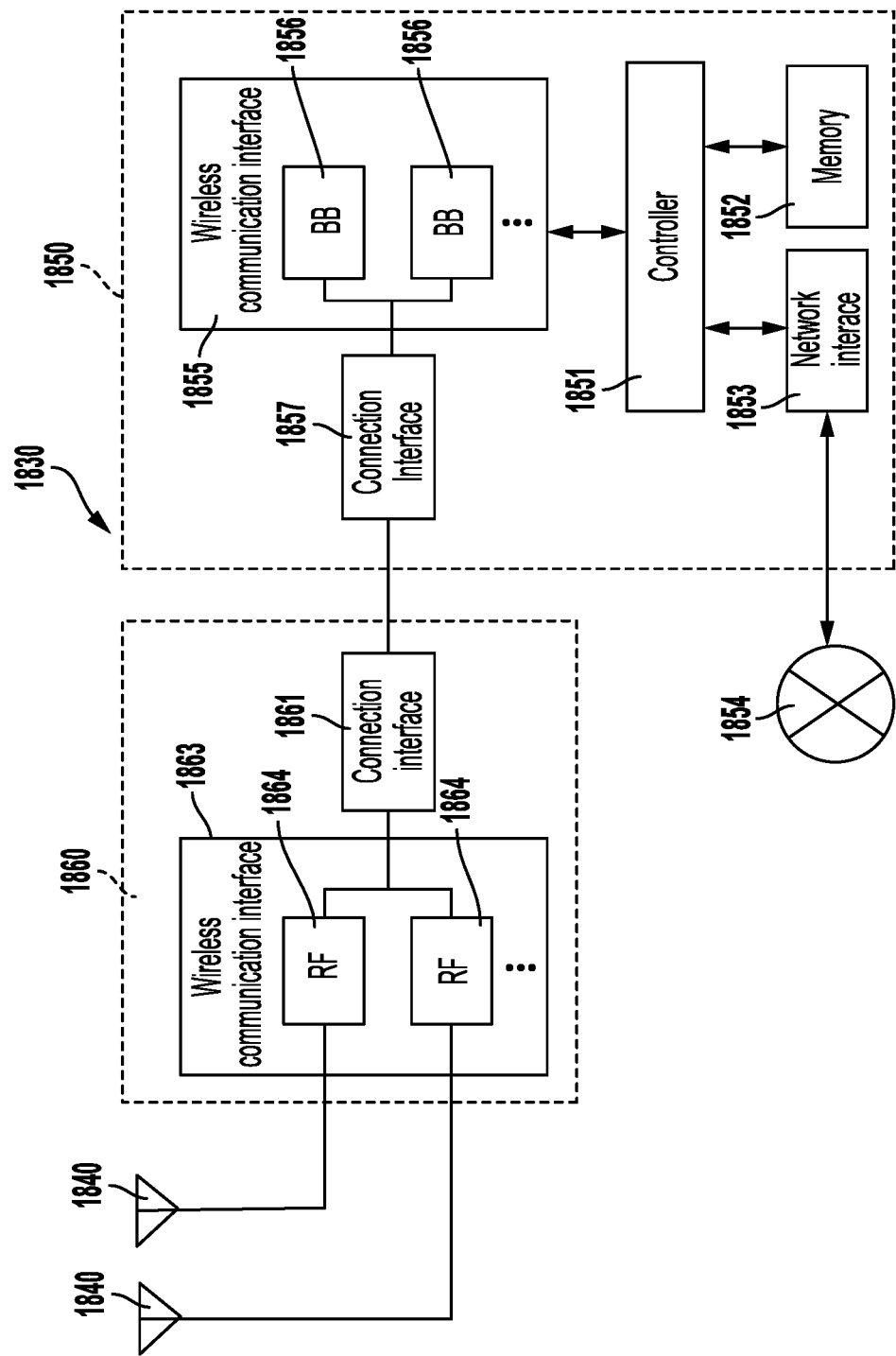
FIG. 18 is a block diagram of a second example of the schematic configuration of eNB.

FIG. 18 is a block diagram showing a second example of a schematic configuration of an eNB to which the technology according to the present disclosure may be applied. An eNB 1830 includes one or more antennas 1840, a base station device 1850 and an RRH 1860. Each antenna 1840 and the RRH 1860 may be connected to each other via an RF cable. The base station device 1850 and the RRH 1860 may be connected to each other via a high-speed line such as a fiber cable.

Each of the antennas 1840 includes one or more antenna elements (such as the multiple antenna elements included in the MIMO antenna), and is used for sending and receiving the radio signal by the RRH 1860. As shown in FIG. 18, the eNB 1830 may include multiple antennas 1840. For example, the multiple antennas 1840 may be compatible with multiple frequency bands used by the eNB 1830. Although an example in which the eNB 180 includes multiple antennas 1840 is shown in FIG. 18, the eNB 1830 may also include a single antenna 1840.

The base station device 1850 includes a controller 1851, a memory 1852, a network interface 1853, a wireless communication interface 1855, and a connection interface 1857. The controller 1851, the memory 1852, and the network interface 1853 are the same as the controller 1721, the memory 1722, and the network interface 1723 described with reference to FIG. 17.

The wireless communication interface 1855 supports any cellular communication solution (such as LTE and LTE-advanced), and provides wireless communication with a terminal located in a sector corresponding to the RRH 1860 via the RRH 1860 and the antenna 1840. The wireless communication interface 1855 may typically include, for example, a BB processor 1856. Other than connecting to an RF circuit 1864 of the RRH 1860 via the connection interface 1857, the BB processor 1856 is the same as the BB processor 1726 described with reference to FIG. 17. As show in FIG. 18, the wireless communication interface 1855 may include multiple BB processors 1856. For example, the multiple BB processors 1856 may be compatible with the multiple frequency bands used by the eNB 1830. Although FIG. 18 illustrates an example in which the wireless communication interface 1855 includes multiple BB processors 1856, the wireless communication interface 1855 may also include a single BB processor 1856.

The connection interface 1857 is an interface for connecting the base station device 1850 (the wireless communication interface 1855) to the RRH 1860. The connection interface 1857 may also be a communication module for communication in the above-described high-speed line that connects the base station device 1850 (the wireless communication interface 1855) to the RRH 1860.

The RRH 1860 includes a connection interface 1861 and a wireless communication interface 1863.

The connection interface 1861 is an interface for connecting the RRH 1860 (the wireless communication interface 1863) to the base station device 1850. The connection interface 1861 may also be a communication module for the communication in the above high-speed line.

The wireless communication interface 1863 sends and receives a radio signal via the antenna 1840. The wireless communication interface 1863 may generally include, for example, the RF circuit 1864. The RF circuit 1864 may include, for example, a frequency mixer, a filter and an amplifier, and send and receive a radio signal via the antenna 1840. The wireless communication interface 1863 may include multiple RF circuits 1864, as shown in FIG. 18. For example, the multiple RF circuits 1864 may support multiple antenna elements. Although FIG. 18 illustrates the example in which the wireless communication interface 1863 includes the multiple RF circuits 1864, the wireless communication interface 1863 may also include a single RF circuit 1864.

In the eNB 1700 shown in FIG. 17 and the eNB 1830 shown in FIG. 18, the processing unit 820, the channel detection unit 830 and the BWP configuration unit 840 described in FIG. 8 may be implemented by the controller 1721 and/or the controller 1851. At least a part of functions may be implemented by the controller 1721 and the controller 1851. For example, the controller 1721 and/or the controller 1851 may determine resources for sending PDCCH, detect the channel and configure the BWP by executing instructions stored in a corresponding memory.

Application Example of a Terminal Device

First Application Example

Figure 19:
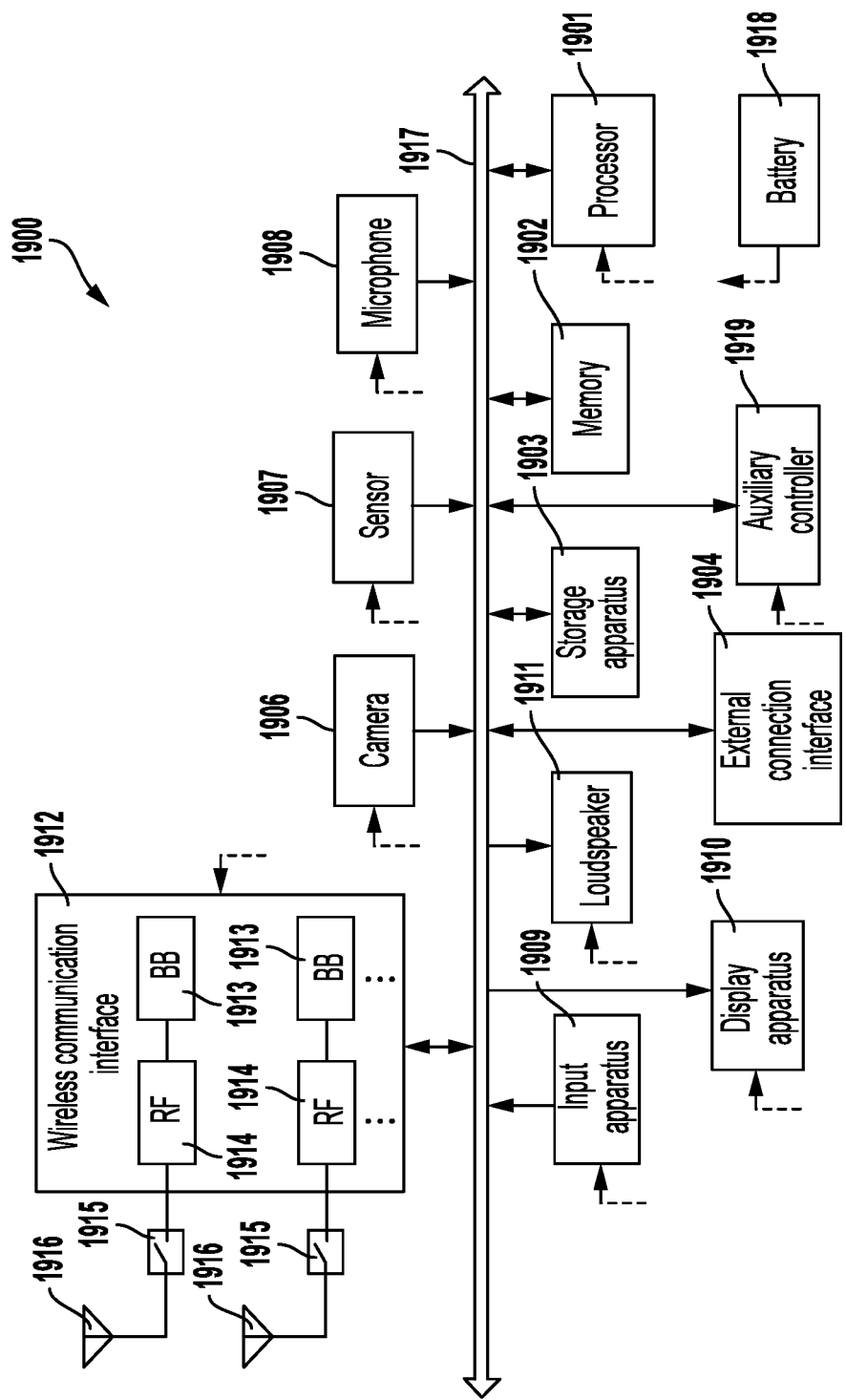
FIG. 19 is a block diagram of an example of a schematic configuration of a smart phone.

FIG. 19 is a block diagram showing an example of exemplary configuration of a smartphone 1900 to which the technology of the present disclosure may be applied. The smart phone 1900 includes a processor 1901, a memory 1902, a storage device 1903, an external connection interface 1904, a camera 1906, a sensor 1907, a microphone 1908, an input device 1909, a display device 1910, a speaker 1911, a wireless communication interface 1912, one or more antenna switches 1915, one or more antennas 1916, a bus 1917, a battery 1918 and an auxiliary controller 1919.

The processor 1901 may be, for example, a CPU or a system on chip (SoC), and control functions of an application layer and other layers of the smart phone 1900. The memory 1902 includes a RAM and a ROM, and stores a program that is executed by the processor 1901, and data. The storage device 1903 may include a storage medium such as a semiconductor memory and a hard disk. The external connection interface 1904 is an interface for connecting an external device (such as a memory card and a universal serial bus (USB) device) to the smart phone 1900.

The camera 1906 includes an image sensor such as a charge coupled device (CCD) and a complementary metal oxide semiconductor (CMOS), and generates a captured image. The sensor 1907 may include a group of sensors such as a measurement sensor, a gyro sensor, a geomagnetic sensor, and an acceleration sensor. The microphone 1908 converts sounds that are inputted to the smart phone 1900 into audio signals. The input device 1909 includes, for example, a touch sensor configured to detect touch onto a screen of the display device 1910, a keypad, a keyboard, a button, or a switch, and receive an operation or information inputted from a user. The display device 1910 includes a screen such as a liquid crystal display (LCD) and an organic light-emitting diode (OLED) display, and displays an output image of the smart phone 1900. The speaker 1911 converts audio signals that are outputted from the smartphone 1900 to sounds.

The wireless communication interface 1912 supports any cellular communication scheme (such as LTE and LTE-Advanced), and performs wireless communication. The wireless communication interface 1912 may typically include, for example, a base band (BB) processor 1913 and a RF circuit 1914. The BB processor 1913 may perform encoding/decoding, modulating/demodulating and multiplexing/demultiplexing, for example, and perform various types of signal processing for wireless communication. The RF circuit 1914 may include a frequency mixer, a filter and an amplifier, for example, and send and receive a radio signal via the antenna 2016. The wireless communication interface 1912 may be a chip module having the BB processor 1913 and the RF circuit 1914 integrated thereon. The wireless communication interface 1912 may include multiple BB processors 1913 and multiple RF circuits 1914, as shown in FIG. 19. Although FIG. 19 illustrates the example in which the wireless communication interface 1912 includes the multiple BB processors 1913 and the multiple RF circuits 1914, the wireless communication interface 1912 may also include a single BB processor 1913 or a single RF circuit 1914.

Moreover, in addition to a cellular communication scheme, the wireless communication interface 1912 may also support a wireless communication scheme of another type, such as a short-distance wireless communication scheme, a near field communication scheme, and a wireless local area network (LAN) scheme. In this case, the wireless communication interface 1912 may include a BB processor 1913 and an RF circuit 1914 for each wireless communication scheme.

Each of the antenna switches 1915 switches connection destinations of the antennas 1916 among multiple circuits (such as circuits for different wireless communication schemes) included in the wireless communication interface 1912.

Each of the antennas 1916 includes one or more antenna elements (such as multiple antenna elements included in an MIMO antenna), and is used for the wireless communication interface 1912 to send and receive radio signals. The smartphone 1900 may include the multiple antennas 1916, as shown in FIG. 19. Although FIG. 19 illustrates the example in which the smartphone 1900 includes the multiple antennas 1916, the smartphone 1900 may also include a single antenna 1916.

In addition, the smart phone 1900 may include an antenna 1916 for each wireless communication scheme. In this case, the antenna switches 1915 may be omitted from the configuration of the smart phone 1900.

The bus 1917 connects the processor 1901, the memory 1902, the storage device 1903, the external connection interface 1904, the camera 1906, the sensor 1907, the microphone 1908, the input device 1909, the display device 1910, the speaker 1911, the wireless communication interface 1912, and the auxiliary controller 1919 to each other. The battery 1918 supplies power to each block of the smartphone 1900 shown in FIG. 19 via feeders which are partially shown by dashed lines in the figure. The auxiliary controller 1919 operates a minimum necessary function of the smartphone 1900, for example, in a sleep mode.

In the smartphone 1900 shown in FIG. 19, the determining unit 220, the channel detection unit 230, the counting 240 and the BWP management unit 250 described in FIG. 2 may be implemented by a processor 1901 or an auxiliary controller 1919. At least a part of function may be implemented by the processor 1901 or the auxiliary controller 1919. For example, the processor 1901 or the auxiliary controller 1919 may determine resources for detecting PDCCH, detect the channel, count the number of times to continuously detect no PDCCH and manage the BWP, by executing instructions stored in the memory 1902 or the storage device 1903.

Second Application Example

Figure 20:
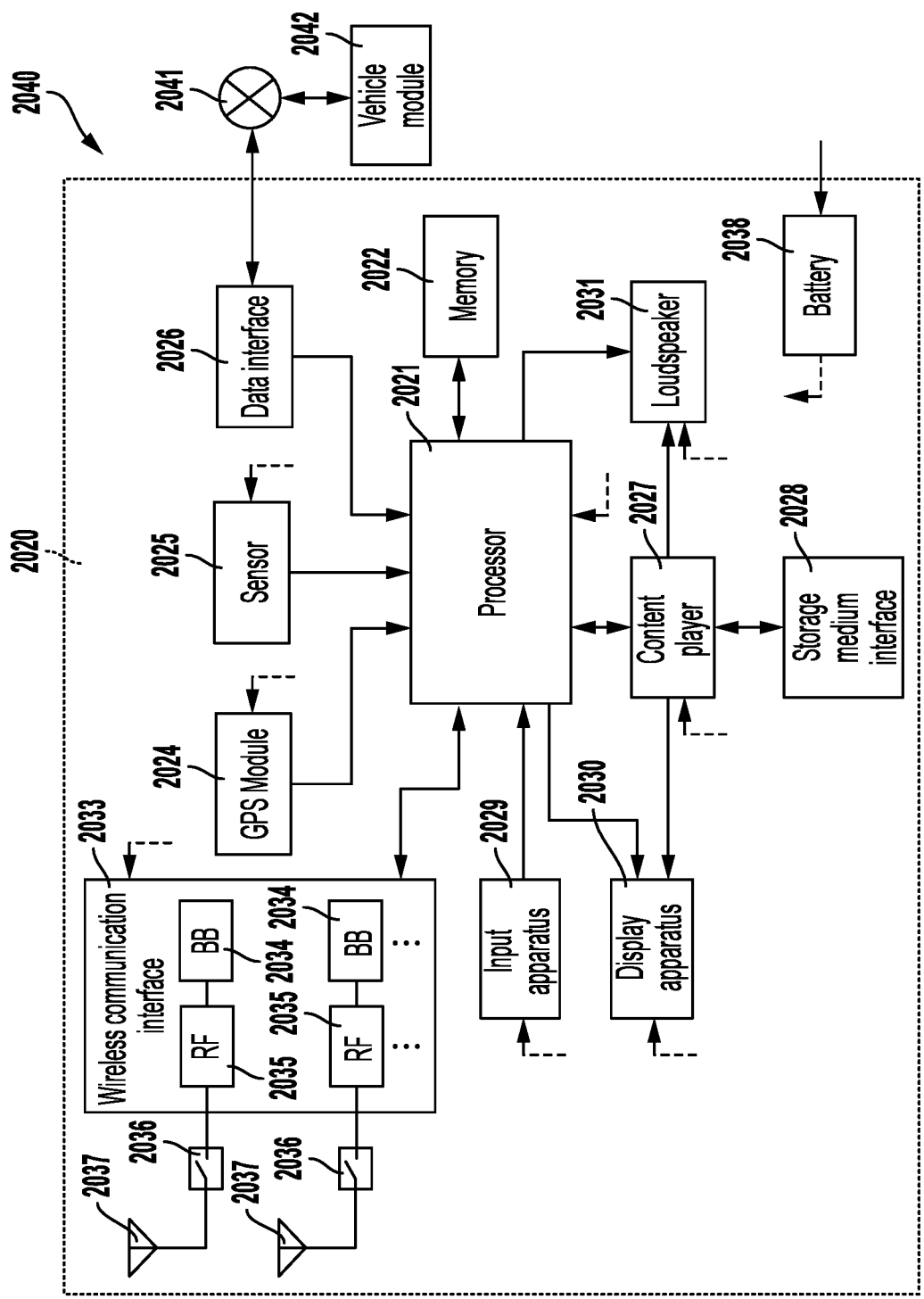
FIG. 20 is a block diagram of an example of a schematic configuration of a vehicle navigation device.

FIG. 20 is a block diagram showing an example of a schematic configuration of a vehicle navigation device 2020 to which the technology according to the present disclosure may be applied. The vehicle navigation device 2020 includes a processor 2021, a memory 2022, a global positioning system (GPS) module 2024, a sensor 2025, a data interface 2026, a content player 2027, a storage medium interface 2028, an input device 2029, a display device 2030, a speaker 2031, a wireless communication interface 2033, one or more antenna switches 2036, one or more antennas 2037, and a battery 2038.

The processor 2021 may be for example the CPU or the SoC, and control the navigation function and other functions of the vehicle navigation device 2020. The memory 2022 includes a RAM and a ROM, and stores a program that is executed by the processor 2021 and data.

The GPS module 2024 determines a position (such as latitude, longitude, and altitude) of the vehicle navigation device 2020 by using GPS signals received from a GPS satellite. The sensor 2025 may include a group of sensors such as a gyroscope sensor, a geomagnetic sensor and an air pressure sensor. The data interface 2026 is connected to, for example, an in-vehicle network 2041 via a terminal that is not shown, and acquires data generated by the vehicle, such as vehicle speed data.

The content player 2027 reproduces content stored in a storage medium (such as a CD and a DVD) that is inserted into the storage medium interface 2028. The input device 2029 includes, for example, a touch sensor configured to detect touch on a screen of the display device 2030, a button, or a switch, and receives an operation or information inputted from a user. The display device 2030 includes a screen such as a LCD or an OLED display, and displays an image of the navigation function or content that is reproduced. The speaker 2031 outputs sounds of the navigation function or the content that is reproduced.

The wireless communication interface 2033 supports any cellular communication scheme (such as LTE and LTE-advanced) and performs wireless communication. The wireless communication interface 2033 may typically include, for example, a BB processor 2034 and an RF circuit 2035. The BB processor 2034 may perform encoding/decoding, modulating/demodulating and multiplexing/demultiplexing, for example, and perform various types of signal processing for wireless communication. The RF circuit 2035 may include a mixer, a filter and an amplifier, for example, and send and receive a radio signal via the antenna 2037. The wireless communication interface 2033 may also be one chip module that has the BB processor 2034 and the RF circuit 2035 integrated thereon. The wireless communication interface 2033 may include multiple BB processors 2034 and multiple RF circuits 2035, as shown in FIG. 20. Although FIG. 20 shows the example in which the wireless communication interface 2033 includes the multiple BB processors 2034 and the multiple RF circuits 2035, the wireless communication interface 2033 may also include a single BB processor 2034 or a single RF circuit 2035.

In addition to the cellular communication scheme, the wireless communication interface 2033 may also support a wireless communication scheme of another type, such as a short-distance wireless communication scheme, a near field communication scheme, and a wireless LAN scheme. In this case, the wireless communication interface 2033 may include a BB processor 2034 and a RF circuit 2035 for each wireless communication scheme.

Each of the antenna switches 2036 switches connection destinations of the antenna 2037 among multiple circuits (such as circuits for different wireless communication schemes) included in the wireless communication interface 2033.

Each of the antennas 2037 includes one or more antenna elements (such as multiple antenna elements included in the MIMO antenna), and is used for the wireless communication interface 203 to send and receive a radio signal. The vehicle navigation device 2020 may include multiple antennas 2037, as shown in FIG. 20. Although FIG. 20 illustrates the example in which the vehicle navigation device 2020 includes the multiple antennas 2037, the vehicle navigation device 2020 may also include a single antenna 2037.

Furthermore, the vehicle navigation device 2020 may include the antenna 2037 for each wireless communication scheme. In this case, the antenna switches 2036 may be omitted from the configuration of the vehicle navigation device 2020.

The battery 2038 supplies power to each block of the vehicle navigation device 2020 shown in FIG. 20 via feeders which are partially shown by dashed lines in the figure. The battery 2038 accumulates power supplied form the vehicle.

In the vehicle navigation device 2020 shown in FIG. 20, the determining unit 220, the channel detection unit 230, the counting 240 and the BWP management unit 250 described in FIG. 2 may be implemented by a processor 2021. At least a part of function may be implemented by the processor 2021. For example, the processor 2021 may determine resources for detecting PDCCH, detect the channel, count the number of times to continuously detect no PDCCH and manage the BWP, by executing instructions stored in the memory 2022.

The technology of the present disclosure may also be implemented as an in-vehicle system (or a vehicle) 2040 including one or more of the blocks of the vehicle navigation device 2020, an in-vehicle network 2041 and a vehicle module 2042. The vehicle module 2042 generates vehicle data such as vehicle speed, engine speed, and fault information, and outputs the generated data to the in-vehicle network 2041.

Preferred embodiments of the disclosure have been described above with reference to the drawings, but the disclosure is not limited to the above examples of course. Those skilled in the art may make various changes and modifications within the scope of the appended claims, and it is to be understood that such changes and modifications naturally fall within the technical scope of the present disclosure.

For example, units shown by a dotted line block in the functional block diagram shown in the drawings indicate that the functional units are optional in the corresponding device, and the optional functional units may be combined appropriately to achieve the required function.

For example, multiple functions of one unit in the above embodiment may be realized by separate devices. Alternatively, multiple functions implemented by multiple units in the above embodiments may be respectively implemented by separate devices. Furthermore, one of the above functions may be implemented by multiple units. Needless to say, such configurations are included in the technical scope of the present disclosure.

In the specification, steps described in the flowchart include not only the processing performed chronologically, but also the processing performed in parallel or individually rather than chronologically. Further, even in the steps processed chronically, without saying, the order may be appropriately changed.

The embodiments of the present disclosure are described in detail in conjunction with the drawings above. However, it should be understood that the embodiments described above are intended to illustrate the present disclosure rather than limit the present disclosure. Those skilled in the art may make various changes and modifications to the embodiments without departing from the essence and scope of the present disclosure. Therefore, the scope of the present disclosure is defined by the attached claims and equivalents thereof.

The invention claimed is:

1. A user equipment, comprising:
processing circuitry configured to:
    perform a first detection process to attempt to detect a Physical Downlink Control Channel (PDCCH) on a first bandwidth part of an unauthorized frequency band in a detection time of a Discontinuous Reception (DRX) cycle; and
    in a case that no PDCCH is detected on the first bandwidth part;
        perform a second detection process to attempt to detect a PDCCH on a second bandwidth part of the unauthorized frequency band;
        in a case that a PDCCH is detected on the second bandwidth part, perform the second detection process to detect a PDCCH on the second bandwidth part in a next DRX cycle of the DRX cycle; and
        in a case that no PDCCH is detected on the second bandwidth part perform the first detection process to detect a PDCCH on the first bandwidth part in a next DRX cycle of the DRX cycle.

2. The user equipment according to claim 1, wherein the processing circuitry is further configured to:
    set a counter, which represents a number of times of the user equipment to continuously detect no PDCCH on the first bandwidth part; and
    in a case that the counter is greater than a predetermined threshold, perform the second detection process to detect a PDCCH on the second bandwidth part.

3. The user equipment according to claim 1, wherein
the first bandwidth part and the second bandwidth part are bandwidth parts for receiving downlink information configured for the user equipment,
the first bandwidth part is in an active state while the second bandwidth part is in an inactive state, and
the processing circuitry is further configured to, in a case that a PDCCH is detected on the second bandwidth part, set the second bandwidth part to be in an active state, and set the first bandwidth part to be in an inactive state.

4. The user equipment according to claim 1, wherein the processing circuitry is further configured to, in a case that a PDCCH is detected on the second bandwidth part, send feedback information.

5. The user equipment according to claim 1, wherein the processing circuitry is further configured to, in a case that no PDCCH is detected on the second bandwidth part, enter sleep time of the DRX cycle.

6. The user equipment according to claim 1, wherein
the second bandwidth part is a default bandwidth part configured for the user equipment, and
the processing circuitry is further configured to:
    receive information about the default bandwidth part from a network side device; and
    in a case that a PDCCH is detected on the second bandwidth part, receive information about an updated default bandwidth part from the network side device.

7. A user equipment, comprising:
processing circuitry configured to:
    perform a first detection process to attempt to detect a Physical Downlink Control Channel (PDCCH) on a first bandwidth part of an unauthorized frequency band in a detection time of a Discontinuous Reception (DRX) cycle; and
    in a case that no PDCCH is detected on the first bandwidth part;
        perform a second detection process to attempt to detect a PDCCH on a second bandwidth part of the unauthorized frequency band;
        determine through a channel detection process that the first bandwidth part is occupied; and
        in a case that the first bandwidth part is occupied, detect a PDCCH on the second bandwidth part.

8. The user equipment according to claim 7, wherein the processing circuitry is further configured to execute the channel detection process after the detection time of the DRX cycle.

9. The user equipment according to claim 7, wherein the processing circuitry is further configured to, in a case that no PDCCH is detected on the first bandwidth part and the first bandwidth part is not occupied, enter sleep time of the DRX cycle.

10. A wireless communication method executed by a user equipment, the wireless communication method comprising:
performing a first detection process to attempt to detect a Physical Downlink Control Channel (PDCCH) on a first bandwidth part of an unauthorized frequency hand in a detection time of a Discontinuous Reception (DRX) cycle; and
in a case that no PDCCH is detected on the first bandwidth part;
    performing a second detection process to attempt to detect a PDCCH on a second bandwidth part of the unauthorized frequency band;
    in a case that a PDCCH is detected on the second bandwidth part, performing the second detection process to detect a PDCCH on the second bandwidth part in a next DRX cycle of the DRX cycle; and
    in a case that no PDCCH is detected on the second bandwidth part, performing the first detection process to detect a PDCCH on the first bandwidth part in a next DRX cycle of the DRX cycle.

\* \* \* \* \*